(12) United States Patent
Gerdes

(10) Patent No.: US 7,079,930 B2
(45) Date of Patent: Jul. 18, 2006

(54) SYSTEM AND METHOD FOR MONITORING THE HANDLING OF A VEHICLE

(75) Inventor: Manfred Gerdes, Oberriexingen (DE)

(73) Assignee: Robert Bosch GmbH, Stuttgart (DE)

( * ) Notice: Subject to any disclaimer, the term of this patent is extended or adjusted under 35 U.S.C. 154(b) by 228 days.

(21) Appl. No.: 10/363,605

(22) PCT Filed: Jul. 2, 2002

(86) PCT No.: PCT/DE02/02398

§ 371 (c)(1),
(2), (4) Date: Aug. 19, 2003

(87) PCT Pub. No.: WO03/004330

PCT Pub. Date: Jan. 16, 2003

(65) Prior Publication Data

US 2004/0030477 A1 Feb. 12, 2004

(30) Foreign Application Priority Data

Jul. 4, 2001 (DE) ................................ 101 32 440

(51) Int. Cl.
*G06F 19/00* (2006.01)
(52) U.S. Cl. .......................................... 701/48; 701/91
(58) Field of Classification Search .................... 701/1, 701/48, 70, 91
See application file for complete search history.

(56) References Cited

U.S. PATENT DOCUMENTS

| 5,189,617 A | * | 2/1993 | Shiraishi | 701/48 |
| 5,351,776 A | * | 10/1994 | Keller et al. | 701/70 |
| 5,369,581 A | * | 11/1994 | Ohsuga et al. | 701/48 |

(Continued)

FOREIGN PATENT DOCUMENTS

| DE | 39 39 292 | 5/1991 |
| DE | 197 04 841 | 8/1998 |
| DE | 198 38 336 | 3/2000 |
| WO | WO01/89898 A1 * | 11/2001 |

OTHER PUBLICATIONS

Schmidt et al., "Required Elements of Integrated Vehicle Control Systems", Vehicle Electronics in the 90's, Dearborn, Oct. 15-17, 1990, Proceedings of the International Congress on Transportation Electronics, New York, IEEE, US, pp. 463-471.

(Continued)

*Primary Examiner*—Gary Chin
(74) *Attorney, Agent, or Firm*—Kenyon & Kenyon LLP

(57) ABSTRACT

A system for monitoring the handling of a vehicle has a plurality of individual systems for influencing the handling of the vehicle, a management device being provided for managing the influence on the handling by the individual systems. A method for monitoring a handling of a vehicle is also described.

12 Claims, 17 Drawing Sheets

U.S. PATENT DOCUMENTS

| | | | | |
|---|---|---|---|---|
| 5,369,584 A | * | 11/1994 | Kajiwara | 701/48 |
| 5,895,434 A | * | 4/1999 | Fennel et al. | 701/48 |
| 5,974,351 A | * | 10/1999 | Croft et al. | 701/48 |
| 6,202,012 B1 | * | 3/2001 | Gile et al. | 701/48 |
| 6,360,152 B1 | * | 3/2002 | Ishibashi et al. | 701/48 |
| 6,434,459 B1 | * | 8/2002 | Wong et al. | 701/36 |
| 6,470,252 B1 | * | 10/2002 | Tashiro et al. | 701/51 |
| 6,553,297 B1 | * | 4/2003 | Tashiro et al. | 701/48 |
| 6,597,975 B1 | * | 7/2003 | Shinmura et al. | 701/48 |
| 6,873,891 B1 | * | 3/2005 | Moser et al. | 701/48 |

OTHER PUBLICATIONS

Fruechte et al., "Integrated vehicle control", 39th IEEE Vehicular Technology Conference: Gateway to New Concepts in Vehicular Technology, San Francisco, CA USA, May 1-3, 1989 pp. 868-877.

* cited by examiner

SYSTEM AND METHOD FOR MONITORING THE HANDLING OF A VEHICLE

FIELD OF THE INVENTION

The present invention relates to a system for monitoring the handling of a vehicle, having a plurality of individual systems for influencing the handling of the vehicle. The present invention also relates to a method of monitoring the handling of a vehicle using a plurality of individual systems.

BACKGROUND INFORMATION

Systems and methods for monitoring the handling of a vehicle are used in particular for stabilizing the handling of motor vehicles. A plurality of different systems exist, which operate on the basis of different measured variables and by influencing different parameters which act upon the handling of the vehicle. Examples of such systems, also known as vehicle dynamics controls, include the Electronic Stability Program (ESP), Active Body Control (ABC), chassis control with superimposed stabilizing intervention (EAR), front axle steering with superimposed stabilizing intervention (EAS) or rear axle steering.

Since a plurality of these individual systems may be installed in the same vehicle, it is possible that effects of the stabilizing interventions of the individual systems become superimposed, creating the typical problem of multiple-variable control. The interventions of the different individual systems may be superimposed additively and thus result in an excessive total intervention; in other words: a plurality of redundant interventions occur. It is also possible that a subtractive superimposition takes place, so that ultimately an excessively weak intervention in the vehicle stability occurs. Additive superimposition of the intervention results mainly in undesirable impairment of driving comfort. In the event of subtractive superimposition of the interventions, there is insufficient vehicle dynamics control, which represents a driving safety problem in particular.

In order to suppress interference of the control measures taken by the individual systems, it has been proposed that specific signals be exchanged between the individual systems or the critical function areas in the individual systems be suppressed. In this way the systems may be made to coexist and their actions not to affect one another negatively. The total benefit of the combined system may thus remain as great as the sum of the benefits of the individual subsystems.

SUMMARY

In accordance with an example embodiment of the present invention, a management device is provided for managing the influence on the handling by the individual systems. By managing the stabilization functions of the individual systems in a targeted manner, it is possible that the total benefit is greater than the sum of the individual benefits. This may take place by the management device influencing the effects of the individual systems as a function of the situation. Thus, vehicle stability with maximum driving comfort and minimum loss of speed may be maintained. In this manner, the individual systems may act fully independently in principle; this means that, without intervention by the management device, the effects of the individual systems are independent of one another. The management device does not intervene until the individual systems might exert an undesirable influence on one another. In this context, it may be advantageous in particular if in the event of a failure of the management device, it may be ensured that the individual systems continue to deploy their vehicle stabilizing actions, which is particularly useful from the point of view of driving safety. The subsystems may also be developed and calibrated separately.

In example systems, ESP, EAS, EAR and/or ABC may be provided as individual systems. These individual systems are mentioned as examples, without restricting the generality of the present invention, which may contain any desired individual systems.

In an example embodiment, the management device may be implemented in a control unit which communicates with control units of the individual systems via an interface. Such an interface may be implemented, for example, within a CAN system. The management device may receive information via CAN or another interface about the activity of the individual systems. This information may be formulated either directly as an effective moment about the vertical axis acting upon the vehicle's center of gravity or a force acting upon the vehicle's center of gravity. It may also be represented as an mediator variable, which is converted in the management device to a moment basis. Conversely, the control units of the individual systems may receive information from the management device via the interface, i.e., via CAN, for example, so that the actions of the individual systems are influenced.

In an example embodiment, the management device is implemented in a separate control unit. The management device is, thus, independent of the control devices of the individual systems in terms of the hardware. The systems may therefore be developed and calibrated independently of one another.

The management device may also be implemented in one or more control unit(s) of the individual systems. The control units of the individual systems are hardware components, which are available anyway. Thus, the hardware cost may be reduced by implementing the management device within these control units of the individual systems.

In one example embodiment of the present invention, setpoint values determined by the individual systems and actual values are input into the management device; the potential effects of the individual systems are determined from the input values, and the management device may output values which influence the effects of individual systems. The management device, thus, acts preventively on any undesirable interventions. The setpoint values determined by the individual systems are detected by the management device and, taking into account the actual values associated with the respective variables, are adjusted to one another. Thus, the management device may output values so that the effects of the individual systems are adjusted as needed.

In this context, it is considered particularly advantageous that the management device may suppress interventions by individual systems. In this variant, the individual systems operate completely independently of one another when no intervention by the management device takes place. This is advantageous, for example, in the event of a failure of the management device. The individual systems are in this case still fully functional. Only when interventions by individual systems are to be suppressed does the management device takes action. In this case, for example, the transmission of an acknowledge signal indicating whether the stabilizing intervention proposed by the individual system is to be suppressed may be sufficient. For example, a symbolic digital 1 may be used for suppression, and a symbolic digital 0 or no signal transmission may be used for full implementation of the stabilizing intervention.

The present invention builds on the generic method in that a management device is provided for managing the influence on the handling by the individual systems. In this way, the advantages of the system according to the present invention are implemented in the method. In the example embodiments of the method described in the following, possible advantages and particular features of the respective system embodiments are also noted.

In example methods according to the present invention, ESP, EAS, EAR and/or ABC may be provided as individual systems.

In one example embodiment, the method is refined by the fact that the management device is implemented in a control unit which communicates with control units of the individual systems via an interface.

In another example embodiment, the management device is implemented in a separate control unit. However, it may of course also be useful to implement the management device in one or more control unit(s) of the individual systems.

In one example embodiment of the method according to the present invention, setpoint values determined by the individual systems and actual values are input into the management device; the potential effects of the individual systems are determined from the input values, and the management device may output values which influence the effects of individual systems.

In this context, it may be advantageous if the management device may suppress interventions by the individual systems.

The present invention is based on the principle that the total benefits of the systems may be greater than the sum of the individual benefits due to the targeted management of the individual systems' stabilization functions. This may occur, for example, by suppressing interfering interventions as a function of the situation, while specific required interventions are jointly allowed. The subsystems may be developed and calibrated independently from one another; only the possibility of information exchange should be ensured. Any desired configuration levels may also be implemented within a vehicle's range of options. Attention should be paid to the correct handling of interfaces in all control units involved. Thus, the development and calibration of the management device may be essential for the joint operation of all individual systems in the vehicle.

DETAILED DESCRIPTION

Figure 1:
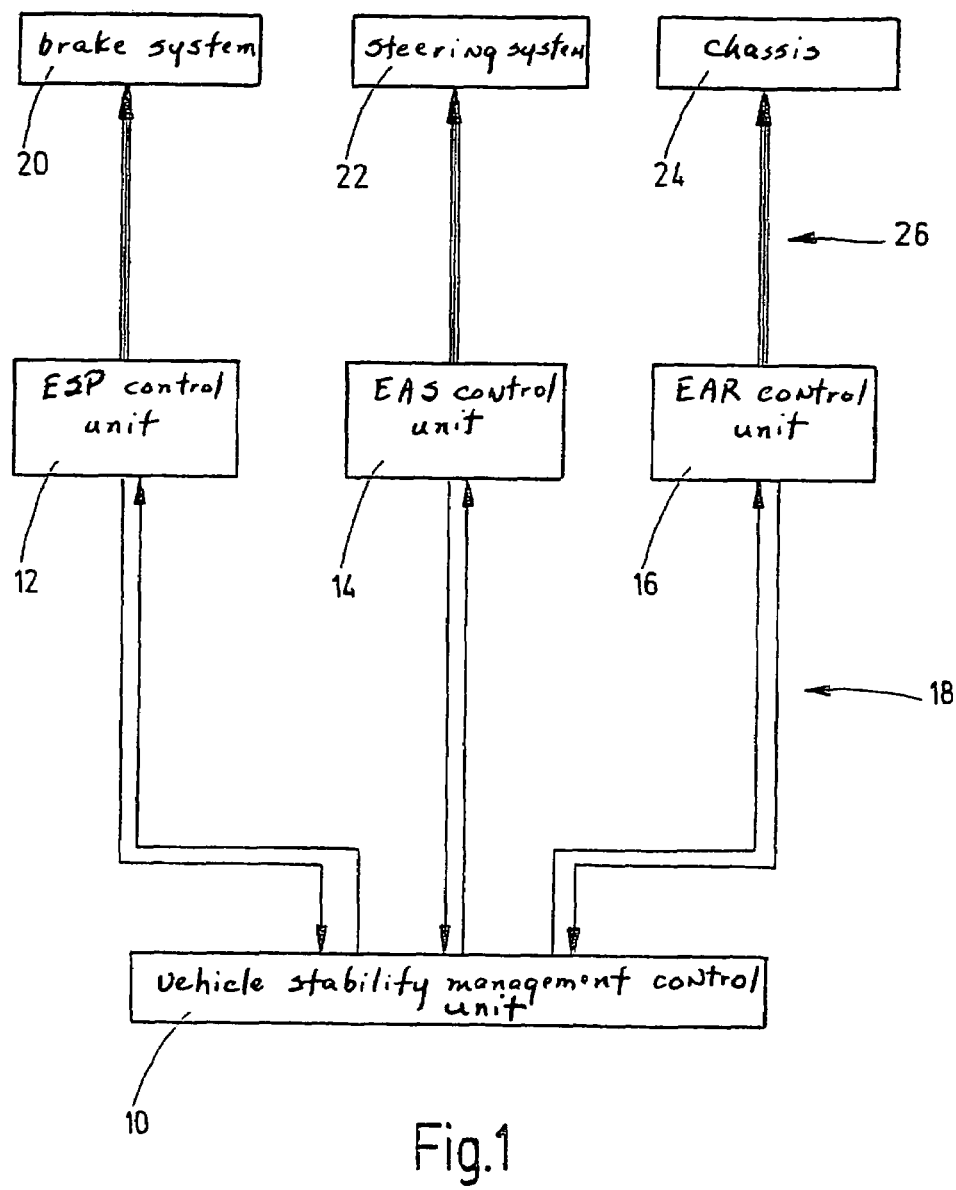
FIG. 1 shows a block diagram illustrating an example system according to the present invention.

FIG. 1 shows a block diagram illustrating an example system according to the present invention. The block diagram shows functional units and arrows symbolizing signals between the individual functional units. Individual signals are symbolized by arrows having a single line. Signal vectors are symbolized by arrows having more than one line. Three individual systems 12, 14, 16 are shown as examples. An ESP control unit 12, an EAS control unit 14, and an EAR control unit 16 each communicate with a vehicle stability management control unit 10 via CAN 18 according to a valid protocol convention. Vehicle stability management control unit 10 is illustrated here as a separate control unit. Another option is to add the additional load of the functions of vehicle stability management control unit 10 to one of the existing control units 12, 14, 16. Control units 12, 14, 16 of the individual units transmit information to vehicle stability management control unit 10, i.e., values having an influence on the intended interventions in the vehicle dynamics in particular. Vehicle stability management control unit 10 in turn transmits values to control units 12, 14, 16 of the individual systems, for example, a "0" for enabling the action of control units 12, 14, 16 of the individual systems and a "1" for blocking those actions. These actions may include, for example, influencing a brake system 20, a steering system 22, or a chassis 24 via appropriate actuators 26.

Figure 2:
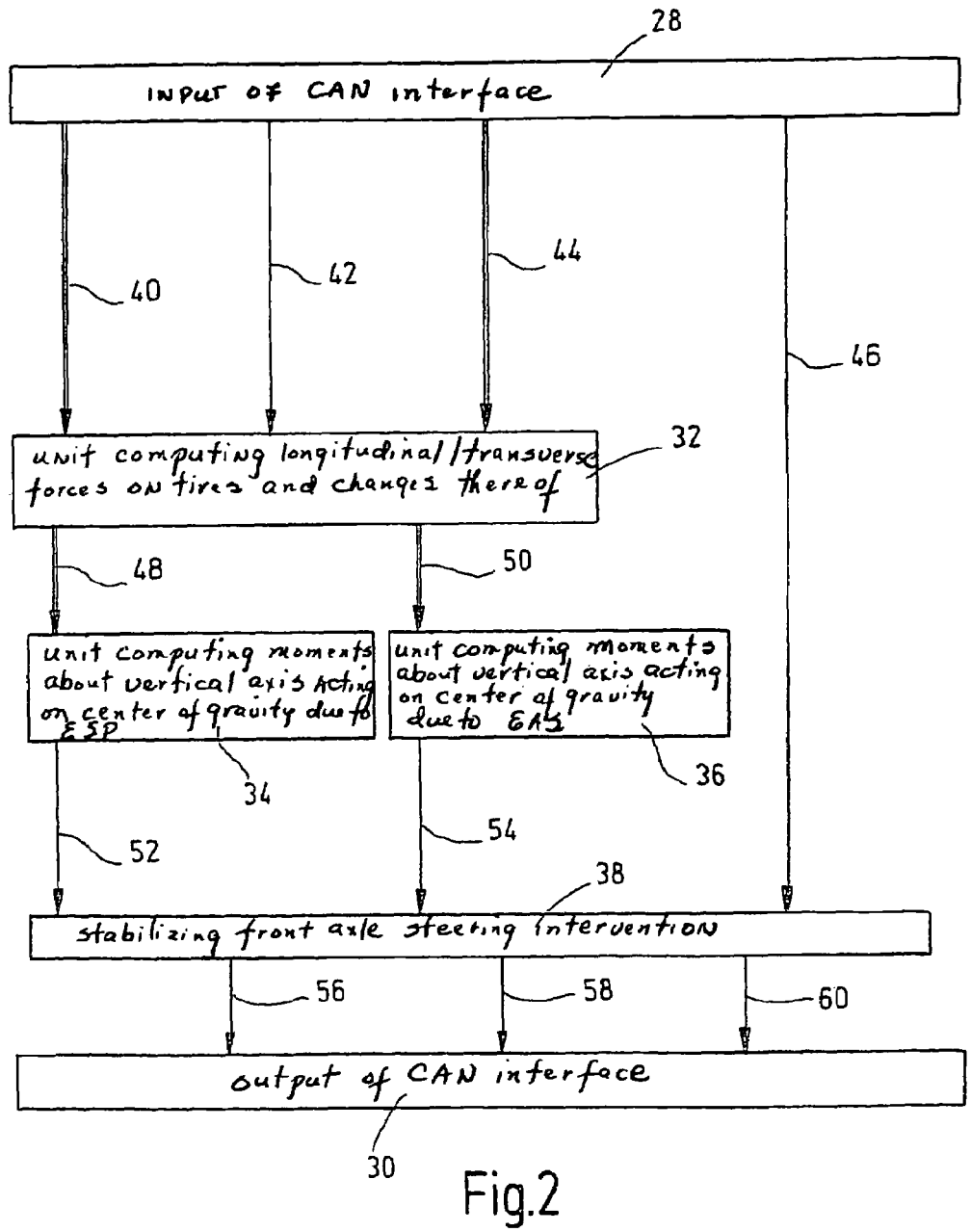
FIG. 2 shows a block diagram illustrating a vehicle stability management system.

FIG. 2 shows a block diagram illustrating a vehicle stability management system. The block diagram shows functional units and arrows symbolizing signals between the individual functional units. Individual signals are symbolized by arrows having a single line. Signal vectors are symbolized by arrows having more than one line. Various values are transmitted to the vehicle stability management system via input 28 of a CAN interface. These values include, for example, a stabilizing setpoint wheel slip by ESP 40 and a superimposed steering angle on the front axle for stabilizing by EAS 42. Furthermore, information is transmitted by subsystems 44. This may include in particular the following variables: slip per wheel, vehicle speed, transverse acceleration, driver steering angle, steering angle on the wheel, accelerator pedal position, driver braking pressure, slip angle of the front and/or rear axles, wheel contact forces, and coefficient of friction.

A differential moment about the vertical axis acting on the vehicle's center of gravity generated by a stabilizing chassis intervention of EAR 46 is transmitted as an additional variable via input 28 of the CAN interface.

Information 40, 42, 44 is transmitted to a unit 32 for computing the longitudinal and transverse forces acting on the vehicle tires and the changes in those forces from physical models of the tire characteristic. Information regarding the longitudinal forces acting on the tires and the changes in those forces due to longitudinal force intervention 48 and regarding the transverse forces acting on the tires and the changes in those forces due to lateral force intervention 50 results from the computation in unit 32. Information 48 is transmitted to a unit 34 for computing moments about the vertical axis acting on the vehicle's center of gravity and changes in those moments due to an ESP intervention. Information 50 is transmitted to a unit 36 for computing moments about the vertical axis acting on the vehicle's center of gravity and changes in those moments due to an EAS intervention. The output variable of unit 34 is a differential moment about the vertical axis acting on the vehicle's center of gravity by a stabilizing braking intervention 52. The output variable of unit 36 is a differential moment about the vertical axis acting on the vehicle's center of gravity by a stabilizing front axle steering intervention 54. The latter information 52, 54 is transmitted to a unit for prioritizing, evaluating, and selecting stabilizing interventions 38. The output variables of unit 38 are instructions for suppressing a longitudinal force intervention 56, a lateral force intervention 58, and/or a normal force intervention 60, which are output as a function of the results of unit 38 via the output of CAN interface 30.

The differential moment about the vertical axis acting on the vehicle's center of gravity due to a stabilizing chassis intervention by EAR 46 is transmitted directly to unit 38 for prioritizing, evaluating, and selecting stabilizing interventions and are taken into account by unit 38.

In summary, in the unit according to FIG. 2, the incoming signals, possibly converted to a moment about the vertical axis acting on the vehicle's center of gravity, are interpreted as a vehicle stabilizing intervention, added up, weighted, and compared. Furthermore, the intervention(s) to be suppressed is (are) selected and fed back. For example, in the illustration according to FIG. 2, it is assumed that ESP transmits the superimposed setpoint slip for each wheel as a characterizing variable of the vehicle stability intervention. Additional or other variables are possible. For the EAS, it is assumed that the superimposed steering angle, which acts to stabilize the vehicle, is used as a transmitted variable. Additional or other variables are possible. For the EAR, it is assumed that the stabilizing moment about the vertical axis acting on the vehicle's center of gravity was directly determined in the EAR control unit on the basis of the desired and/or planned confirmation of the EAR actuator system and transmitted and is thus directly available to the vehicle stability management control unit. Also in this case additional or other variables are possible.

Figure 3:
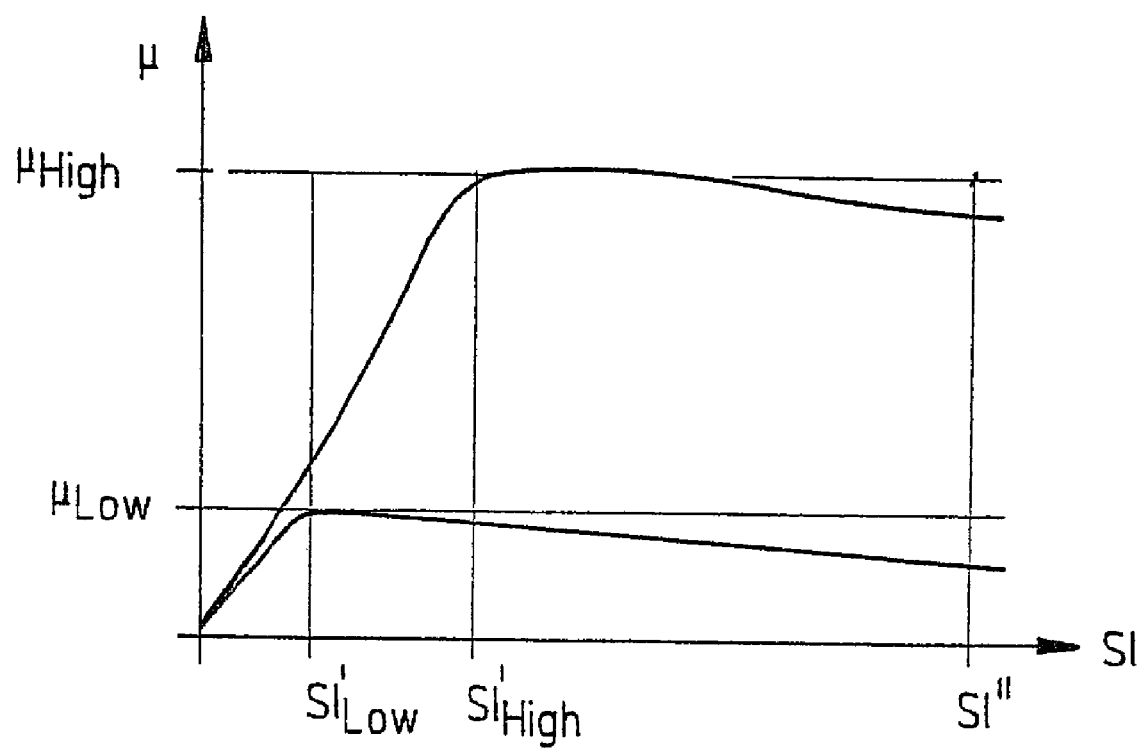
FIG. 3 shows a μ-slip curve for a tire model in the longitudinal direction of the tire.

FIG. 3 shows a μ-slip curve for a tire model in the longitudinal direction of the tire. Simplified tire characteristic curves in the longitudinal direction and a possible approximation as a function of the longitudinal tire slip and the coefficient of friction of the road surface are shown, the parameters set and these characteristic curves being used as examples for a plurality of possible implementations of the relationship between longitudinal tire force, longitudinal tire slip, and road surface coefficient of friction. Longitudinal wheel force μ is plotted on the vertical axis; μ is defined as $$\mu = F_{Lwheel}/F_{Nwheel}$$

i.e., longitudinal wheel force divided by the normal wheel force. Slip S1 is plotted on the horizontal axis. The following equations are used to approximate the longitudinal forces:

$$\mu = \sqrt{(a_x^2 + a_y^2)}/g$$

where g=9.81 m/s$^2$;

$a_x$, $a_y$: acceleration in the longitudinal and transverse directions, respectively.

Since no signals for the above computation of the coefficient of friction are available in acceleration-free travel in the longitudinal and transverse directions, a coefficient of friction μ=0.0 is specified in this case. In order to avoid problems with such zero values, the range of values of the coefficient of friction is limited to $\mu_{min}$=0.1. $\mu_{max}$=1.0 may be used, for example, as the upper limit value. A higher limit value is also possible.

The characteristic values for the approximation of the longitudinal forces are calculated as follows, K1' denoting a force gradient, and the given numerical values being preferably settable.

$$S1'(\mu) \approx 0.04 + 0.08 * \mu$$

$$K1'(\mu) \approx 1.00 + 12.0 * \mu$$

$$S1'' \approx 0.70\%.$$

The actual approximation of the longitudinal forces using S1 as input information is then done for S1<S1'(μ) according to the equation:

$$F_L = F_n * K1'(\mu) * S1.$$

Otherwise, longitudinal force $F_L$ is determined according to the following equation:

$$F_L = F_n * K1'(\mu) * S1' * (S1' + S1'')/(S1 + S1'')$$

The downward slope of the characteristic curve in the case of high slip S1 is taken into account by the second calculation method of $F_L$.

With respect to these computations, it should be pointed out that the coefficient of friction is referred to the center of gravity of the vehicle. In this way, unequal coefficients of friction on the right and left sides of the vehicle are taken into account by averaging.

Figure 4:
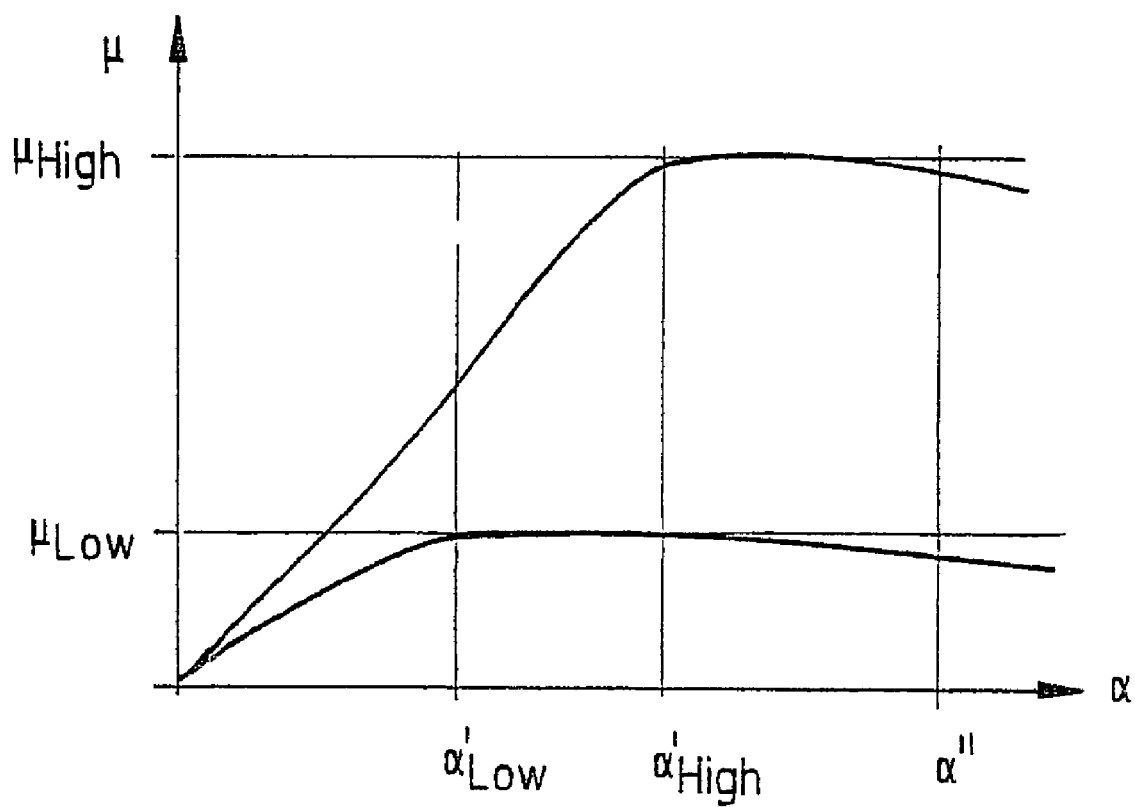
FIG. 4 shows a μ-slip curve for a tire model in the transverse direction of the tire.

FIG. 4 shows a μ-slip curve for a tire model in the transverse direction of the tire. The lateral tire force, defined as $$\mu = F_{swheel}/F_{Nwheel},$$

i.e., lateral wheel force divided by the normal wheel force, is plotted on the vertical axis of the diagram.

Slip angle parameter α is plotted on the right-hand axis of the diagram.

Reference is made to the discussions on FIG. 3 for determining the coefficient of friction information.

The setting parameters may be determined on the basis of the following equations, the numerical values being preferably settable in this case too:

$$\alpha'(\mu) \approx 0.80 + 4.00 * \mu$$

$$ks'(\mu) \approx 0.11 + 0.17 * \mu$$

$$\alpha'' \approx 30°$$

The actual approximation then takes place according to the following equations; a distinction is to be made between two cases. In the first case, $\alpha < \alpha'(\mu)$. The lateral force is then computed according to the following equation:

$$F_S(\mu,\alpha) = ks'(\mu) * \alpha * F_N.$$

In other cases, the lateral force is computed according to the following equation:

$$F_S(\mu,\alpha) = ks'(\mu) * \alpha'' * F_N * (\alpha' + \alpha'')/(\alpha + \alpha'').$$

In the second case, the drop in the lateral force for high values of $\alpha$ is taken into account.

For low values of $\alpha$, the following approximation may also be used:

$$F_S(\mu,\alpha) \approx ks'(\mu) * F_n * \delta = \Delta F_S(\mu) * \delta.$$

In view of the unequal coefficients of friction between the right and left sides of the vehicle, reference is again made to the discussions on FIG. 3.

Figure 5:
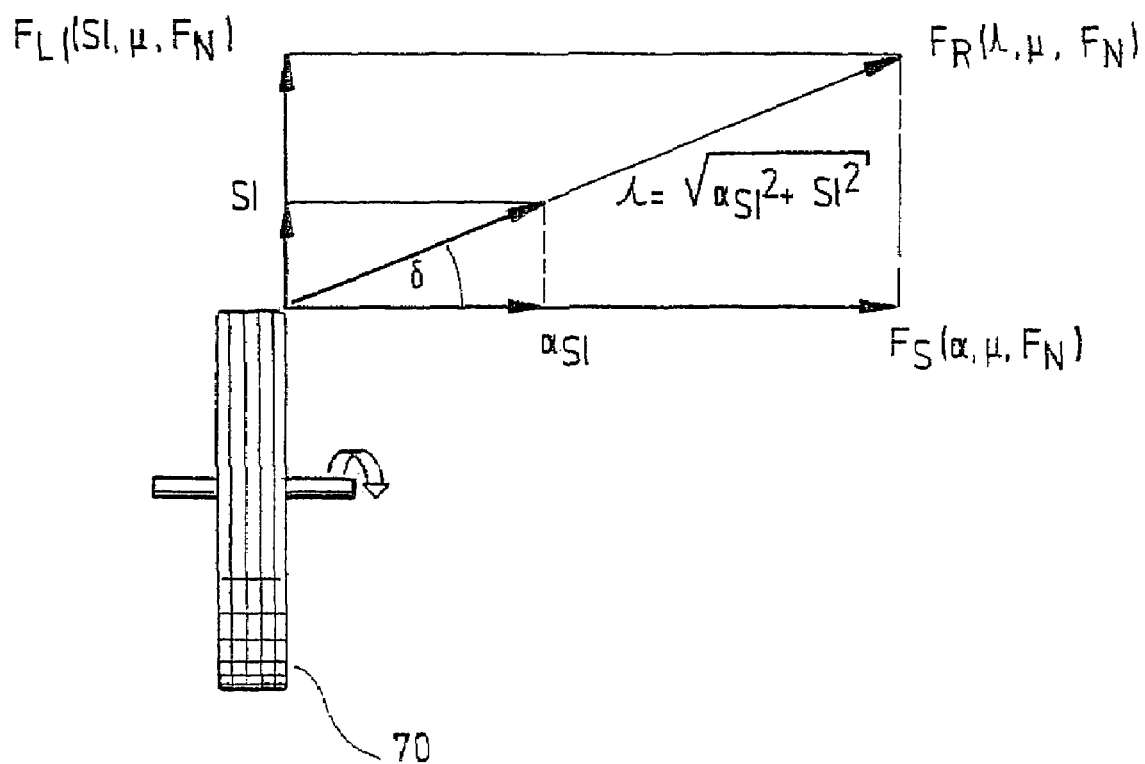
FIG. 5 shows a diagram for elucidating the angular relationships of the tire forces.

FIG. 5 shows a diagram explaining the angular relationships of the tire forces. The square root of the sum of squares of longitudinal tire forces $F_L$ (S1, $\mu$, $F_N$) and $F_S$ ($\alpha$, $\mu$, $F_N$) of tire 70, the first of which is determined by coefficient of friction $\mu$ and longitudinal slip S1 utilizing coefficient of friction $\mu$, and the second by coefficient of friction $\mu$ and tire slip angle $\alpha$, forms the total tire force.

$$F_R(\lambda,\mu,F_N) = \sqrt{(F_S(\alpha,\mu,F_N)^2 + F_L(S1,\mu,F_N)^2)}.$$

Assuming that the tire characteristic curves are in the linear range in the longitudinal and transverse directions, i.e., that the slip and the slip angle are small, the slip and slip angle in FIG. 5 may be plotted as shown. In this way, force angle $\delta$ may be defined from slip S1 and slip angle $\alpha_{S1}$ as $$\tan(\delta) = F_S/F_L = \alpha_{S1}/S1.$$

Due to the non-linearities that arise, this equation does not apply exactly for large slip and slip angle values, but is sufficiently accurate in many applications for the estimate used here.

A longitudinal vehicle force $F_L$ may be estimated in this way from a predefined wheel force $F_R$ as $$F_L = F_R * S1/\lambda$$

and transverse tire force may be estimated as $$F_S = F_R * \alpha_{S1}/\lambda.$$

These equations may be solved relatively easily using longitudinal slip equivalent $\lambda$ plotted in FIG. 5; divisions by zero must be handled in a special way.

In principle, it is possible to determine, on the basis of the tire force models explained with reference to FIGS. 4 and 5, the longitudinal force and the transverse force acting on a tire. The above-mentioned models, however, assume a unidirectional action of the forces. Superimposition in the case of bidirectional action of the forces should be handled in a special way. If one attempts to determine the longitudinal force and the transverse force separately and then to superimpose one on the other, problematic effects may arise in evaluating the forces due to the non-unambiguous correspondence between the tire forces and the slip angle, as well as between the tire forces and the slip at the maxima of the curves for medium values.

This may be avoided using the largely valid assumption of a symmetrical tire behavior in the longitudinal and transverse directions, for example, by the following procedure:

The maximum transmittable tire force is assumed to be $\mu * F_N$.

The square root of the sum of squares of the slip angle and the longitudinal slip form a longitudinal slip equivalent $\lambda$.

The variation of the resulting tire force results from a similar characteristic model as explained in connection with FIGS. 3 and 4.

The tire force is split into longitudinal force components and transverse force components using the angular relationships, this split being based on the slip and the slip angle.

The tire forces are approximated using the following equations. The coefficient of friction information is again formed as explained with reference to FIG. 3.

The following characteristic values are used, the numerical values being settable in this case too.

P_$K_\lambda$1≈0.80 [%]
P_$K_\lambda$2≈4.00 [%]
P_$K_\lambda$3≈0.11 [-]
P_$K_\lambda$4≈0.17 [-]
P_$K_\lambda$5≈70.0 [%]

Approximation takes place according to the following equations, broken down into two cases:

$$\lambda = \sqrt{(\alpha_{S1}^2 + S1^2)}$$

$$\lambda'(\mu) = P\_K_\lambda 1 + P\_K_\lambda 2 * \mu$$

$$k_\lambda(\mu) = P\_K_\lambda 3 + P\_K_\lambda 4 * \mu$$

$$\lambda'' = P\_K_\lambda 5$$

First case:

$$\lambda < \lambda'(\mu).$$

In this case, the lateral force is computed according to the following equation:

$$F_S(\mu,\lambda) = ks'(\mu) * \lambda * Fn.$$

In the second case, i.e., $\lambda \geq \lambda'(\mu)$, the lateral force is computed as follows:

$$F_S(\mu,\lambda) = k_\lambda'(\mu) * \lambda'' * Fn * (\lambda' + \lambda'')/(\lambda + \lambda'')$$

In the second case, the lateral force drops at high values of longitudinal slip equivalent $\lambda$.

Conversion to the longitudinal force is then performed according to the equation $$F_L(\mu,\lambda,S1) = F_S(\mu,\lambda) * S1/\lambda.$$

Conversion to the transverse force is performed according to $$F_L(\mu, \lambda, S1) = F_S(\mu, \lambda) * \alpha_{S1}/\lambda.$$

For the discussions regarding the unequal coefficients of friction between right and left vehicle sides, reference is made to FIG. 3.

Figure 6:
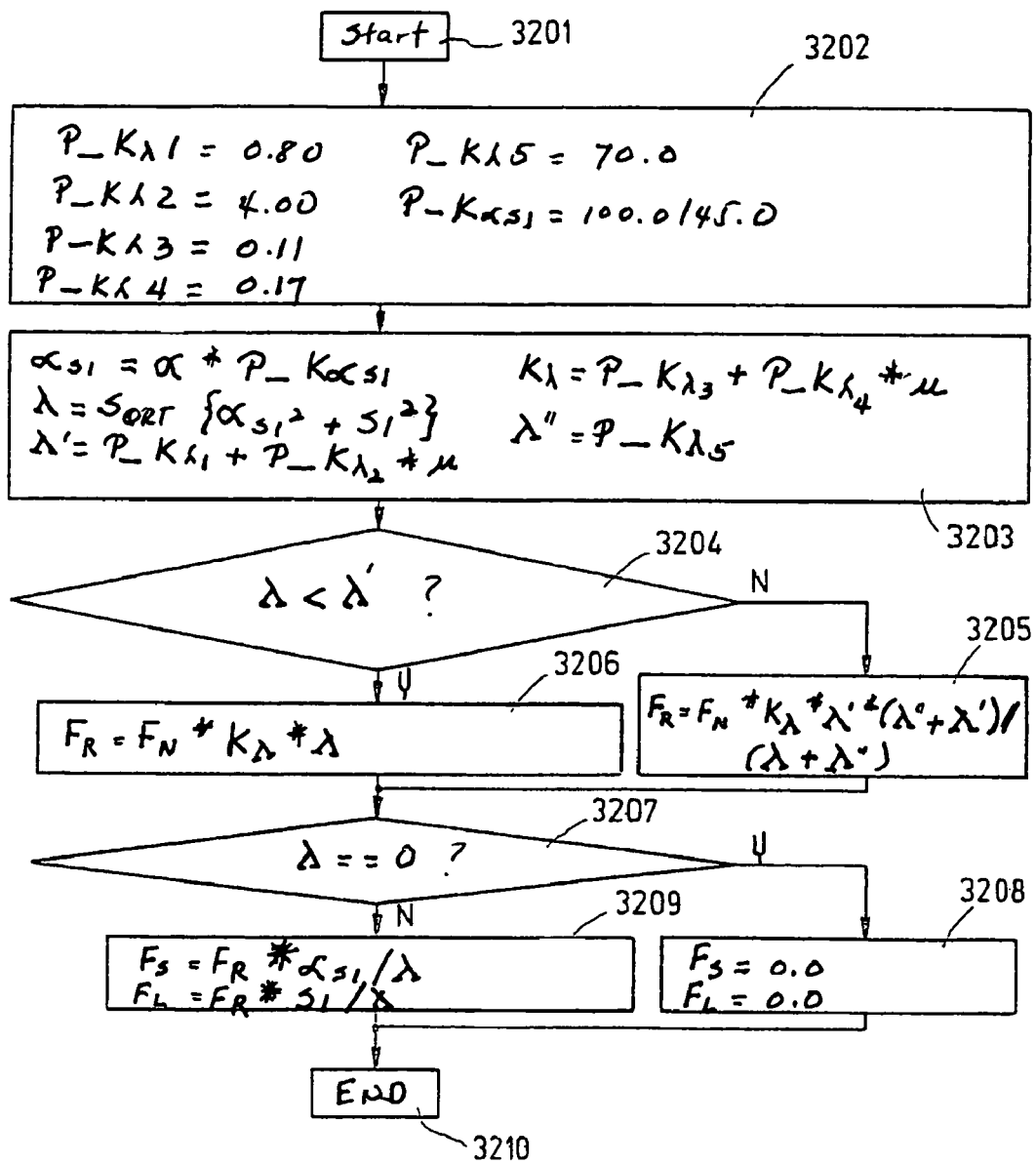
FIG. 6 shows a flow chart for elucidating a tire force computation for forces applied bidirectionally.

FIG. 6 shows a flow chart explaining a tire force computation for forces applied bidirectionally. The meaning of the individual method steps is provided first.

3201: Start

3202: P_$K_\lambda$1=0.80 . . . [%] parameter 1 for determining the position of the maximum P_$K_\lambda$2=4.00 . . . [%] parameter 2 for determining the position of the maximum P_$K_\lambda$3=0.11 . . . [-] parameter 3 for determining the upward slope from the origin P_$K_\lambda$4=0.17 . . . [-] parameter 4 for determining the upward slope from the origin P_$K_\lambda$5=70.0 . . . [%] parameter 5 for determining the downward slope for high values P_K$_{\alpha S1}$=100.0/45.0 . . . [%/°] conversion factor from slip angle to slip

3203: $\alpha_{S1} = \alpha * P\_K_{\alpha S1}$ . . . conversion of slip angle to longitudinal slip equivalent $\lambda = S_{QRT}\{\alpha_{S1}^2 + S1^2\}$ . . . sum of squares of slip and longitudinal slip $\lambda' = P\_K_{\lambda_1} + P\_K_{\lambda_2} * \mu$ . . . maximum tire force, as a function of the longitudinal slip equivalent $K_\lambda = P\_K_{\lambda_3} + P\_K_{\lambda_4} * \mu$ . . . tire force gradient with regard to the origin of the longitudinal slip equivalent $\lambda'' = P\_K_{\lambda_5}$ . . . definition of the downward slope of the tire force from max. with regard to the longitudinal slip equivalent

3204: $\lambda < \lambda'$ . . . longitudinal slip equivalent less than value at maximum tire force?

3205: $F_R = F_N * K_\lambda * \lambda' * (\lambda'' + \lambda')/(\lambda + \lambda'')$ . . . total tire force from—maximum with regard to the longitudinal slip equivalent

3206: $F_R = F_N * K_\lambda * \lambda$ . . . total tire force up to—maximum with regard to the longitudinal slip equivalent

3207: $\lambda = 0$ . . . longitudinal slip equivalent equal to 0.0?

3208: $F_S = 0.0$ . . . transverse tire force
$F_L = 0.0$ . . . longitudinal tire force

3209: $F_S = F_R * \alpha_{S1}/\lambda$ . . . transverse tire force
$F_L = F_R * S1/\lambda$ . . . longitudinal tire force

3210: End

After the start in step 3201, parameters for determining the tire forces are set in step 3202. In step 3203, further variables, which may be used in steps 3204 through 3210, are determined using the parameters from step 3202. In step 3204, first it is determined whether the longitudinal slip equivalent is less than the value at maximum tire force. If this is the case, in step 3206 the total tire force is computed according to the relationship given there. If this is not the case, in step 3205 another relationship given there is used for computing the total tire force. In step 3207, it is checked whether the longitudinal slip equivalent is equal to zero. If this is the case, the transverse tire force $F_S$ and longitudinal tire force $F_L$ are set to zero, avoiding division by zero. If this is not the case, i.e., the longitudinal slip equivalent is not equal to zero, the transverse tire force and the longitudinal tire force are computed according to the relationships given there. In step 3210, the method according to FIG. 6 is terminated.

Figure 7:
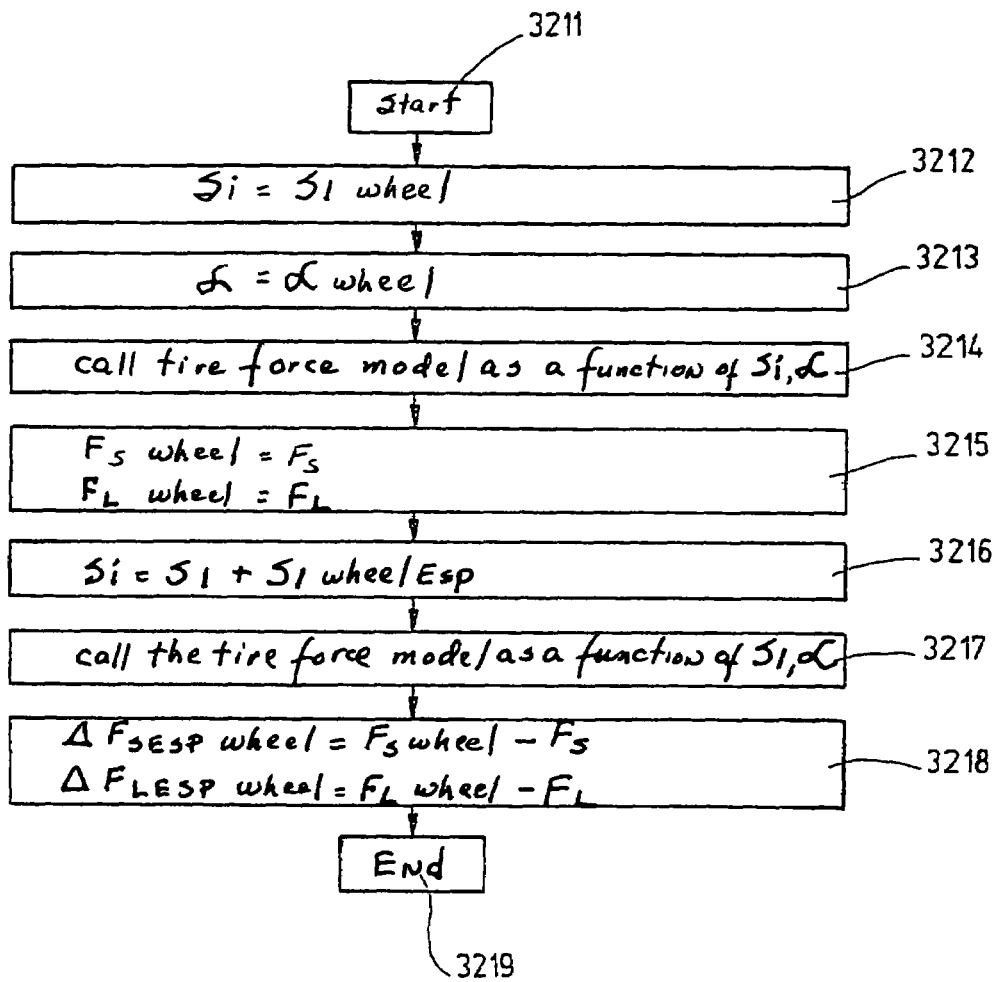
FIG. 7 shows a flow chart for elucidating the computation of a tire force and a change in tire force in an ESP longitudinal force intervention.

FIG. 7 shows a flow chart explaining the computation of a tire force and a change in tire force in the case of an ESP longitudinal force intervention. In an ESP intervention, the slip angle on the front axle and on the rear axle are known but predefined variables, while the wheel slip may be influenced in order to vary the longitudinal force. The flow chart of FIG. 7 shows the computation of the instantaneous wheel forces and changes in wheel forces due to the ESP intervention. This algorithm must be run for each wheel. First the meaning of the individual steps is defined.

3211: Start

3212: S1=S1wheel . . . longitudinal slip of the wheel in question

3213: $\alpha = \alpha$wheel . . . slip angle of the wheel

3214: Call the tire force model as a function of S1, $\alpha$

3215: $F_S$wheel=$F_S$ . . . store lateral force
$F_L$wheel=$F_L$ . . . store longitudinal force

3216: S1=S1+S1wheelEsp . . . longitudinal slip intervention for wheel

3217: Call the tire force model as a function of S1, $\alpha$

3218: $\Delta F_{SESP}$wheel=$F_S$wheel−$F_S$ . . . store change in lateral force $\Delta F_{LESP}$wheel=$F_L$wheel−$F_L$ . . . store change in longitudinal force

3219: End

After the start of computations in step 3211, in step 3212 the longitudinal slip of a wheel in question is determined. Subsequently in step 3213, the slip angle of the wheel is determined. In step 3214, the tire force model is called as a function of parameters S1 and $\alpha$ which have been determined. In step 3215, the lateral force and the longitudinal force which have been determined are stored as parameters $F_S$wheel and $F_L$wheel, respectively. In step 3216, the longitudinal slip intervention for the wheel is taken into account. In step 3217, the tire force model is called again as a function of the new parameters S1 and $\alpha$. In step 3218 the change in the lateral force and the change in the longitudinal force are determined by subtraction and stored. In step 3219 the computation of the tire force for the wheel in question is terminated.

Figure 8:
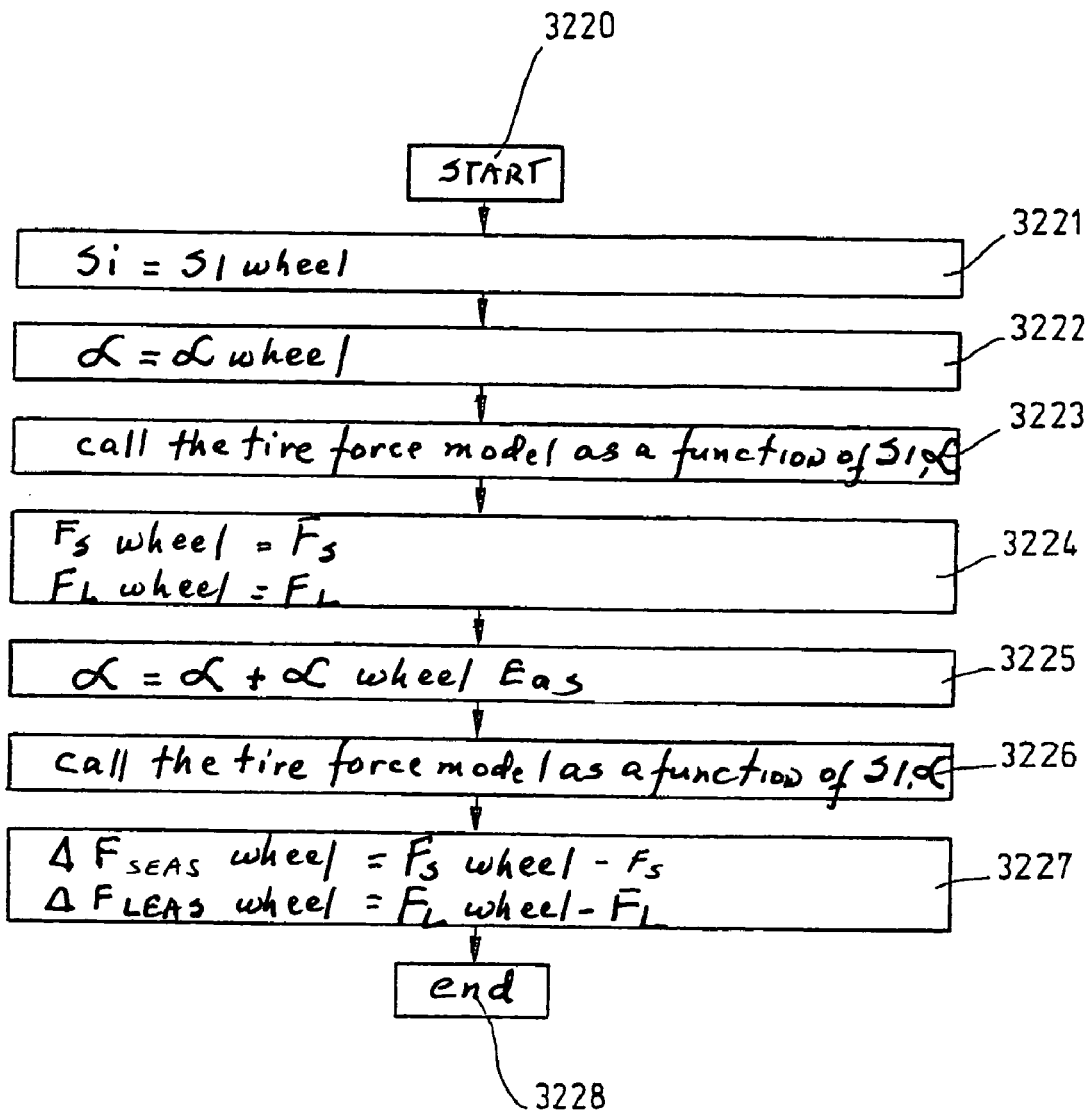
FIG. 8 shows a flow chart for elucidating the computation of a tire force and a change in tire force in an EAS lateral force intervention.

FIG. 8 shows a flow chart explaining the computation of a tire force and a change in tire force in an EAS lateral force intervention. In EAS intervention, the wheel slip on the front axle and on the rear axle are known but predefined variables, while the slip angle at least on the front axle may be influenced in order to vary the lateral force. The flow chart according to FIG. 8 shows the computation of the instantaneous wheel forces and changes in wheel forces due to the EAS intervention. The slip angle interventions by the EAS are stored separately for each wheel and made equal to zero for the rear wheels. Thus the algorithm explained with reference to FIG. 8 may be run in the same way for all wheels and thus even for vehicles having an active rear axle steering and appropriate signal assignments. The algorithm explained in the following must be run for each wheel. The meaning of the method steps shown in FIG. 8 is explained first.

3220: Start

3221: S1=S1wheel . . . longitudinal slip of the wheel in question

3222: $\alpha = \alpha$wheel . . . slip angle of the wheel

3223: Call the tire force model as a function of S1, $\alpha$

3224: $F_S$wheel=$F_S$ . . . store lateral force
$F_L$wheel=$F_L$ . . . store longitudinal force

3225: $\alpha = \alpha + \alpha$wheelEas . . . longitudinal slip intervention for the wheel

3226: Call the tire force model as a function of S1, $\alpha$

3227: $\Delta F_{SEAS}$wheel=$F_S$wheel−$F_S$ . . . store change in lateral force $\Delta F_{LEAS}$wheel=$F_L$wheel−$F_L$ . . . store change in longitudinal force

3228: End

In step 3220 the computation of the tire force and the change in tire force for the EAS longitudinal force intervention is initiated. In step 3221, the longitudinal slip of the wheel in question is stored as variable S1. In step 3222, the slip angle of the wheel is stored as variable $\alpha$. In step 3223, the tire force model is called using the stored parameters S1 and $\alpha$. In step 3224, the lateral force and the longitudinal force of the wheel are stored. Subsequently, in step 3225, a longitudinal slip intervention of the wheel is taken into account and a new variable $\alpha$ is stored. In step 3226, the tire force model is called again as a function of the new parameters S1 and $\alpha$. Subsequently, in step 3227, a change in the lateral force is computed by subtraction and stored. A change in the longitudinal force is also computed by subtraction and then stored. In step 3228 the method shown in FIG. 8 is terminated.

Figure 9:
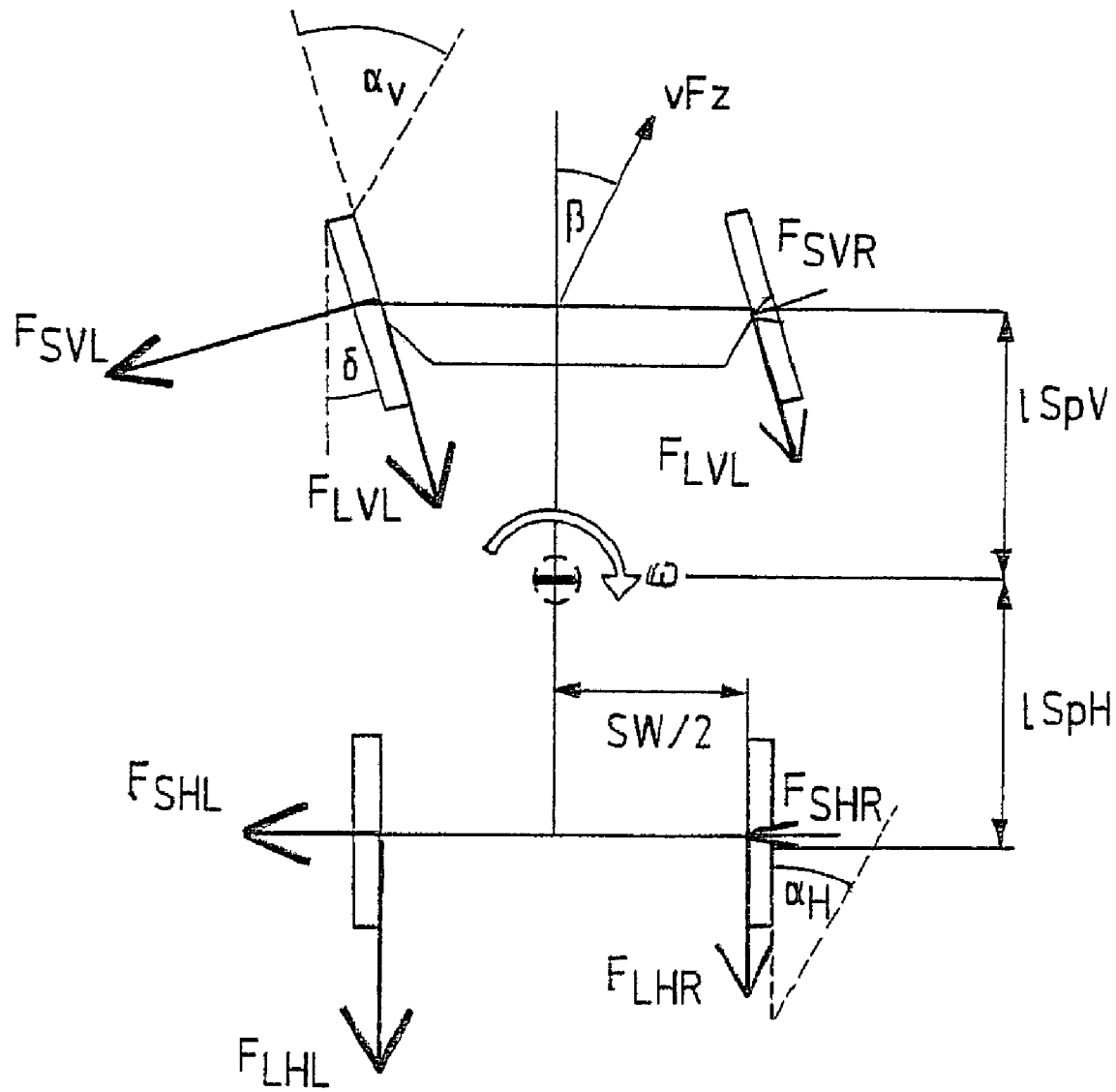
FIG. 9 shows a diagram for elucidating a vehicle model for computing the moments about the vertical axis acting on the vehicle's center of gravity.

FIG. 9 shows a diagram explaining a vehicle model for computing the torques about the vertical axis acting on the center of gravity of the vehicle. The symbols shown in FIG. 9 have the following meanings:

δ: steering angle; for EAS, front axle only
$α_H$: tire slip angle, rear axle
$α_v$: tire slip angle, front axle
ω: vehicle yaw rate
β: vehicle float angle
vFz: vehicle speed, straight-ahead
$F_{Lxy}$: longitudinal tire force on axle x (front v/rear h) and side y (right/left)
$F_{Sxy}$: transverse tire force on axle x (front v/rear h) and side y (right/left)

Figure 10:
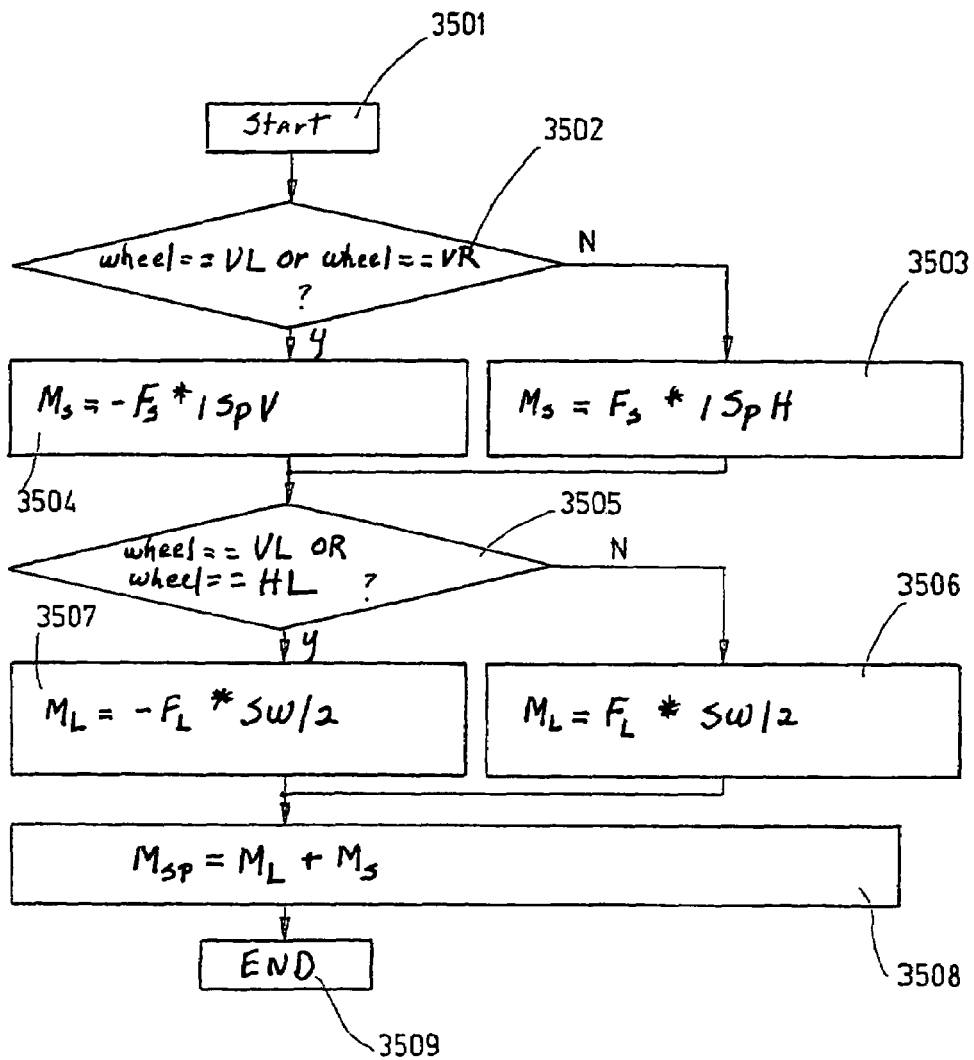
FIG. 10 shows a flow chart for elucidating the computation of moments about the vertical axis acting on the vehicle's center of gravity.

For the sake of simplicity, it is assumed that the vehicle float angle and the tire slip angle are small and thus a splitting of the forces into sine and cosine components may be omitted without major loss of accuracy. The moments are determined as follows from the longitudinal force (index L) and transverse force (index S):

$M_L = -F_L * SW/2$ for left wheels $M_L = F_L * SW/2$ for right wheels $M_S = -F_S * 1SpV$ for front axle $M_S = F_S * 1SpH$ for rear axle FIG. 10 shows a flow chart explaining the computation of moments about the vertical axis acting on the center of gravity of the vehicle. Using the calculated transverse and longitudinal forces acting on the tire and the effective lever arm, the moment acting on the center of gravity of the vehicle due to the particular wheel, as well as the change in this moment, may be determined from the changes in the forces due to the ESP and EAS interventions. The values thus determined may be added up for all wheels, which is explained with reference to FIG. 10. The meaning of the steps illustrated in FIG. 10 is explained first:

3501: Start
3502: wheel==VL OR wheel ==VR . . . wheel is on front axle
3503: $M_S = F_S * 1SpH$ . . . moment acting on the vehicle center of gravity due to the lateral force on the rear axle
3504: $M_S = -F_S * 1SpV$ . . . moment acting on the vehicle center of gravity due to the lateral force on the front axle
3505: wheel==VL OR wheel==HL . . . wheel is on left side
3506: $M_L = F_L * SW/2$ . . . moment acting on the vehicle center of gravity due to right-side longitudinal force
3507: $M_L = -F_L * SW/2$ . . . moment acting on the vehicle center of gravity due to left-side longitudinal force
3508: $M_{Sp} = M_L + M_S$ . . . moment component acting on the vehicle center of gravity due to this wheel
3509: End After the start of the program flow in step 3501, in step 3502 it is determined whether the wheel is on the front axle. If this is the case, in step 3504 the moment acting on the vehicle's center of gravity due to the lateral force on the front axle is computed. If this is not the case, in step 3503 the moment acting on the vehicle's center of gravity due to the lateral force on the rear axle is computed.

Subsequently, in step 3505, it is determined whether the wheel is on the left vehicle side. If this is the case, in step 3507 the moment acting on the vehicle's center of gravity due to a longitudinal force on the left side is determined. If this is not the case, in step 3506 the moment acting on the vehicle's center of gravity due to a longitudinal force on the right side is determined.

Subsequently, in step 3508, the moment component acting on the vehicle's center of gravity due to the wheel in question is determined by the addition of the moments determined in steps 3503 or 3504 and 3506 or 3507. In step 3509 the program flow is terminated.

Figure 11:
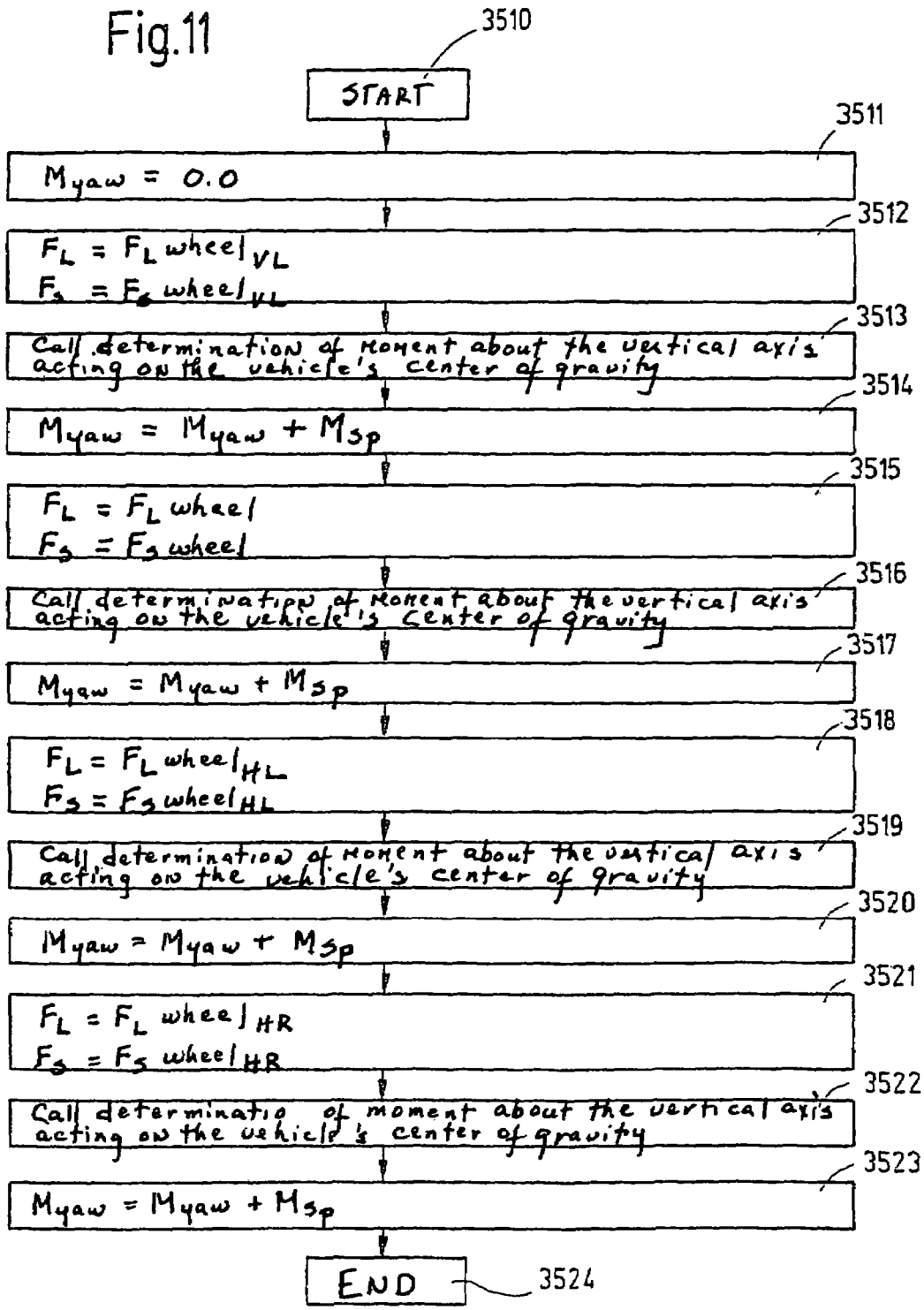
FIG. 11 shows a flow chart for elucidating the computation of a moment acting on the center of gravity by summation.

FIG. 11 shows a flow chart explaining the computation of a moment acting on the vehicle's center of gravity by summation. The meaning of the method steps shown in FIG. 11 is explained first.

3510: Start
3511: $M_{yaw} = 0.0$ . . . default value for moment acting on the vehicle's center of gravity
3512: $F_L = F_L\text{wheel}_{VL}$
$F_S = F_S\text{wheel}_{VL}$ . . . front left
3513: Call determination of moment about the vertical axis acting on the vehicle's center of gravity
3514: $M_{yaw} = M_{yaw} + M_{Sp}$ . . . yaw moment from adding up moments acting on the vehicle's center of gravity
3515: $F_L = F_L\text{wheel}_{VR}$
$F_S = F_S\text{wheel}_{VR}$ . . . front right
3516: Call determination of moment about the vertical axis acting on the vehicle's center of gravity
3517: $M_{yaw} = M_{yaw} + M_{Sp}$ . . . yaw moment from adding up moments acting on the vehicle's center of gravity
3518: $F_L = F_L\text{wheel}_{HL}$
$F_S = F_S\text{wheel}_{HL}$ . . . rear left
3519: Call determination of moment about the vertical axis acting on the vehicle's center of gravity
3520: $M_{yaw} = M_{yaw} + M_{Sp}$ . . . yaw moment from adding up moments acting on the vehicle's center of gravity
3521: $F_L = F_L\text{wheel}_{HR}$
$F_S = F_S\text{wheel}_{HR}$ . . . rear right
3522: Call determination of moment about the vertical axis acting on the vehicle's center of gravity
3523: $M_{yaw} = M_{yaw} + M_{Sp}$ . . . yaw moment from adding up moments acting on the vehicle's center of gravity
3524: End The summation of all wheels for determining the moment acting on the vehicle's center of gravity starts in step 3510. Subsequently, in step 3511, a default value for the moment acting on the center of gravity is determined. In step 3512, the longitudinal and lateral forces of the front left wheel are stored as variables to be processed further.

In step 3513, these are used in determining the moment about the vertical axis acting on the vehicle's center of gravity. In step 3514, the yaw moment is computed by adding up the moments acting on the vehicle's center of gravity.

In steps 3515 through 3517, the method explained with reference to steps 3512 through 3514 for the front left wheel is repeated for the front right wheel. Then, the method is repeated in steps 3518 through 3520 for the rear left wheels. Following the computation for the rear left wheel, the method is performed in the same way for the rear right wheel in steps 3521 through 3523. In step 3524 the sequence is terminated.

Figure 12:
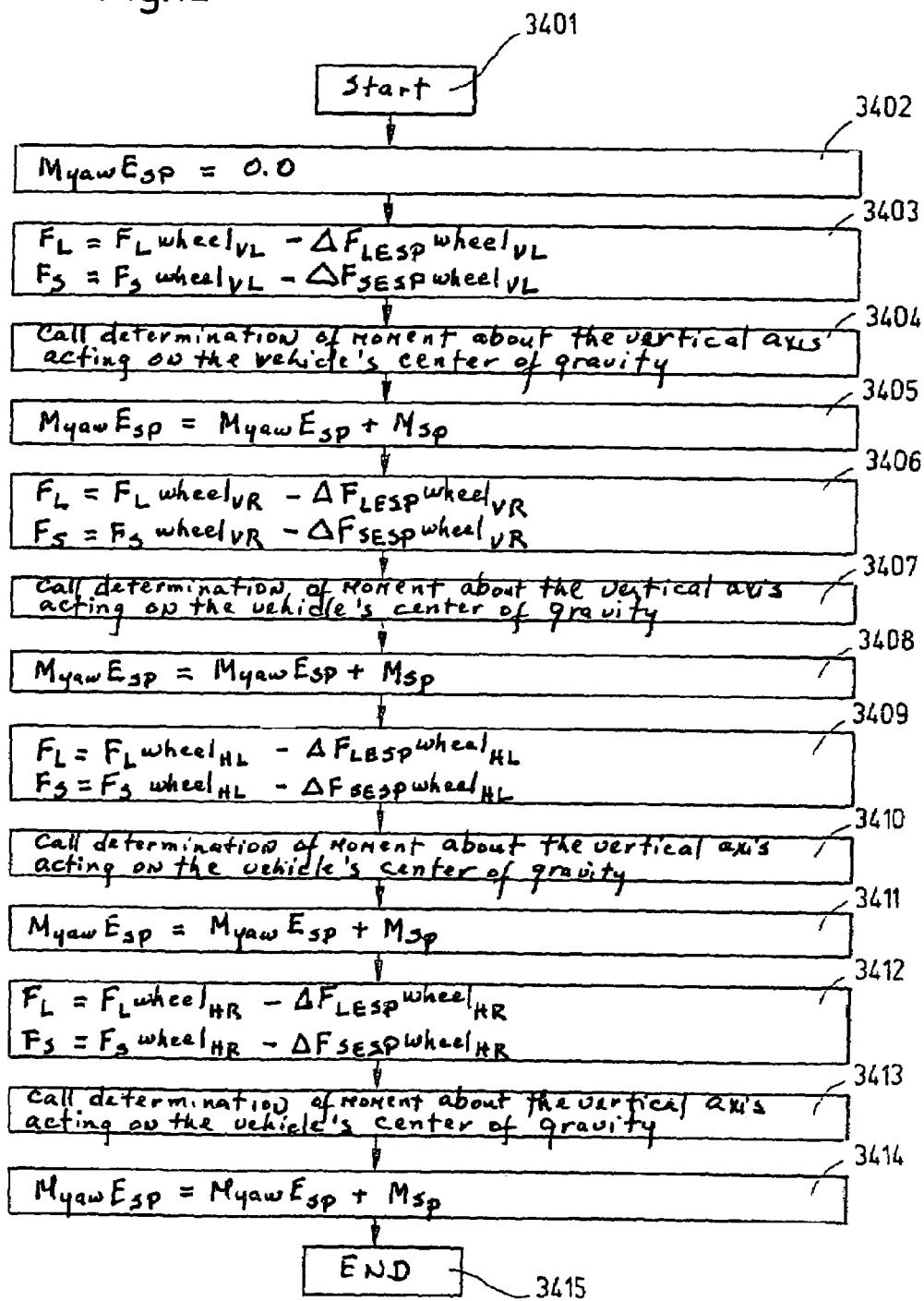
FIG. 12 shows a flow chart for elucidating the computation of a moment acting on the center of gravity by summation in ESP longitudinal force intervention.

FIG. 12 shows a flow chart explaining the computation of a moment acting on the vehicle's center of gravity by summation in the case of ESP longitudinal force intervention. First, the meaning of the method steps shown in FIG. 12 is explained again.

3401: Start
3402: $M_{yaw}E_{SP} = 0.0$ . . . default value for moment acting on the vehicle's center of gravity
3403: $F_L = F_L\text{wheel}_{VL} - \Delta F_{LESP}\text{wheel}_{VL}$
$F_S = F_S\text{wheel}_{VL} - \Delta F_{SESP}\text{wheel}_{VL}$ . . . front left 3404: Call determination of moment about the vertical axis acting on the vehicle's center of gravity 3405: $M_{yaw}E_{SP}=M_{yaw}E_{SP}+M_{SP}$ . . . yaw moment from adding up moments acting on the vehicle's center of gravity 3406: $F_L=F_L\text{wheel}_{VR}-\Delta F_{LESP}\text{wheel}_{VR}$
$F_S=F_S\text{wheel}_{VR}-\Delta F_{SESP}\text{wheel}_{VR}$ . . . front right 3407: Call determination of moment about the vertical axis acting on the vehicle's center of gravity 3408: $M_{yaw}E_{SP}=M_{yaw}E_{SP}+M_{SP}$ . . . yaw moment from adding up moments acting on the vehicle's center of gravity 3409: $F_L=F_L\text{wheel}_{HL}-\Delta F_{LESP}\text{wheel}_{HL}$
$F_S=F_S\text{wheel}_{HL}-\Delta F_{SESP}\text{wheel}_{HL}$ . . . rear left 3410: Call determination of moment about the vertical axis acting on the vehicle's center of gravity 3411: $M_{yaw}E_{SP}=M_{yaw}E_{SP}+M_{Sp}$ . . . yaw moment from adding up moments acting on the vehicle's center of gravity 3412: $F_L=F_L\text{wheel}_{HR}-\Delta F_{LESP}\text{wheel}_{HR}$
$F_S=F_S\text{wheel}_{HR}-\Delta F_{SESP}\text{wheel}_{HR}$ . . . rear right 3413: Call determination of moment about the vertical axis acting on the vehicle's center of gravity 3414: $M_{yaw}E_{SP}=M_{yaw}E_{SP}+M_{Sp}$ . . . yaw moment from adding up moments acting on the vehicle's center of gravity 3415: End The sequence starts in step 3401. In step 3402, the default value of zero is initially set for the moment acting on the vehicle's center of gravity. Subsequently, in step 3403, from the longitudinal wheel force on the front left wheel and the change in longitudinal force, determined for this wheel, a value is determined, which is stored as the variable for the longitudinal force. Furthermore, from the particular variables, the value of variable $F_s$ is determined. In step 3404, the moment about the vertical axis acting on the vehicle's center of gravity is determined using the variables determined in step 3403. In step 3405, the yaw moment is computed by adding up the moments acting on the vehicle's center of gravity.

In steps 3406 through 3408, steps 3403 through 3405, which were executed there for the front left wheel, are executed for the front right wheel. Then, in steps 3409 through 3411, the method is executed for the rear left wheel. Finally, in steps 3412 through 3414, the method is executed for the rear right wheel. In step 3415 the sequence of this program flow is terminated.

Figure 13:
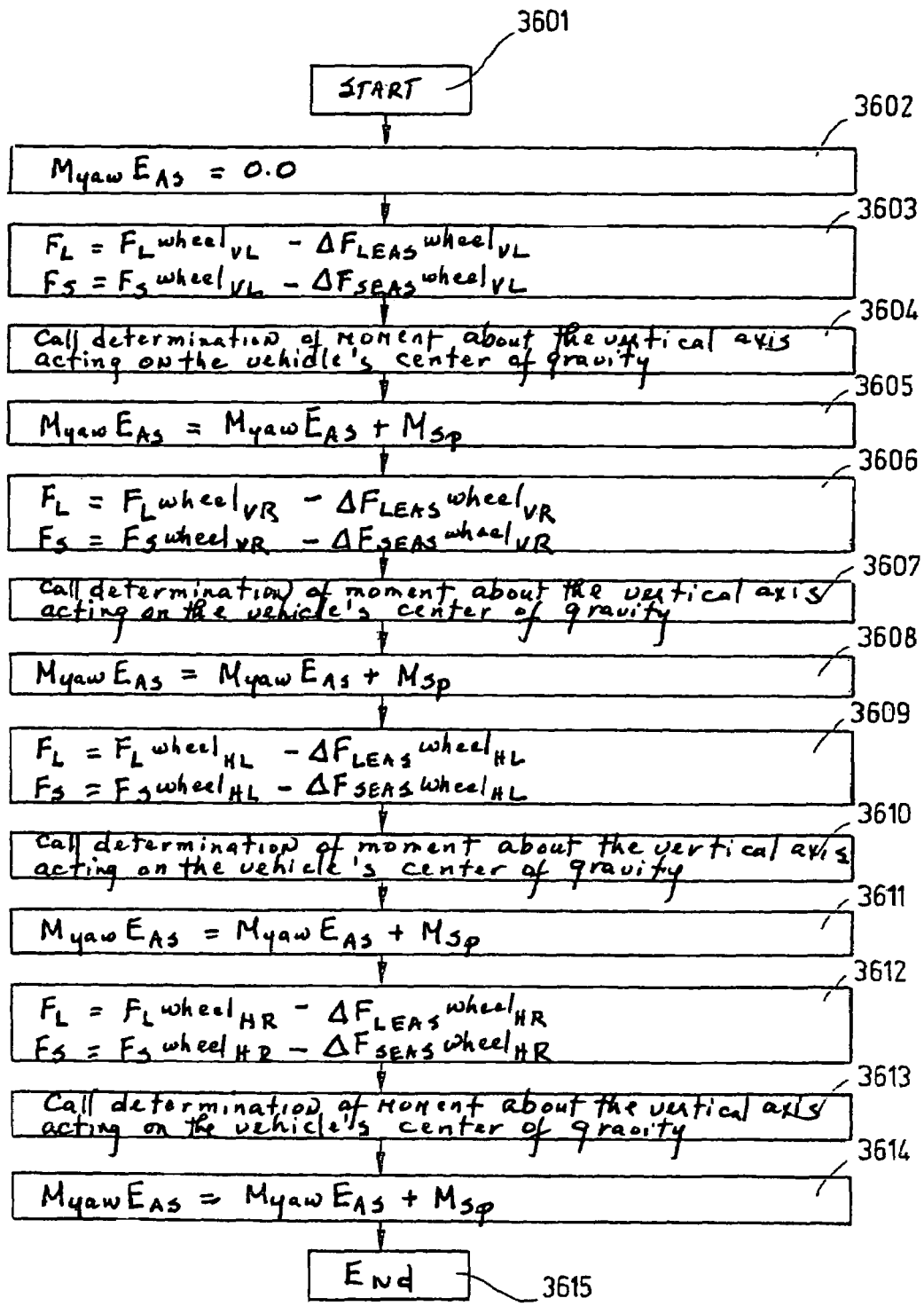
FIG. 13 shows a flow chart for elucidating the computation of a moment acting on the center of gravity by summation in EAS lateral force intervention.

FIG. 13 shows a flow chart explaining the computation of a moment acting on the vehicle's center of gravity by summation in the case of EAS lateral force intervention.

First, the meaning of the method steps shown in FIG. 13 is explained.

3601: Start

3602: $M_{yaw}E_{AS}=0.0$ . . . default value for the moment acting on the vehicle's center of gravity 3603: $F_L=F_L\text{wheel}_{VL}-\Delta F_{LEAS}\text{wheel}_{VL}$
$F_S=F_S\text{wheel}_{VL}-\Delta F_{SEAS}\text{wheel}_{VL}$ . . . front left 3604: Call determination of moment about the vertical axis acting on the vehicle's center of gravity 3605: $M_{yaw}E_{AS}=M_{yaw}E_{AS}+M_{Sp}$ . . . yaw moment from adding up moments acting on the vehicle's center of gravity 3606: $F_L=F_L\text{wheel}_{VR}-F_{LEAS}\text{wheel}_{VR}$
$F_S=F_S\text{wheel}_{VR}-F_{SEAS}\text{wheel}_{VR}$ . . . front right 3607: Call determination of moment about the vertical axis acting on the vehicle's center of gravity 3608: $M_{yaw}E_{AS}=M_{yaw}E_{AS}+M_{Sp}$ . . . yaw moment from adding up moments acting on the vehicle's center of gravity 3609: $F_L=F_L\text{wheel}_{HL}-\Delta F_{LEAS}\text{wheel}_{HL}$
$F_S=F_S\text{wheel}_{HL}-\Delta F_{SEAS}\text{wheel}_{HL}$ . . . rear left 3610: Call determination of moment about the vertical axis acting on the vehicle's center of gravity 3611: $M_{yaw}E_{AS}=M_{yaw}E_{AS}+M_{Sp}$ . . . yaw moment from adding up moments acting on the vehicle's center of gravity 3612: $F_L=F_L\text{wheel}_{HR}-\Delta F_{LEAS}\text{wheel}_{HR}$
$F_S=F_S\text{wheel}_{HR}-\Delta F_{SEAS}\text{wheel}_{HR}$ . . . rear right 3613: Call determination of moment about the vertical axis acting on the vehicle's center of gravity 3614: $M_{yaw}E_{AS}=M_{yaw}E_{AS}+M_{Sp}$ . . . yaw moment from adding up moments acting on the vehicle's center of gravity 3615: End After the start of the routine in step 3601, in step 3602 a default value of zero is set for the moment acting on the vehicle's center of gravity. Then from the longitudinal force and the calculated change in longitudinal force, the longitudinal force used for determining the moment about the vertical axis acting on the vehicle's center of gravity is determined. In the same way, the lateral force is determined from the corresponding values. In step 3604, the determination of the moment about the vertical axis acting on the vehicle's center of gravity using the variables determined in step 3603 is called. In step 3605, the yaw moment is determined by adding up the moments acting on the vehicle's center of gravity.

In steps 3606 through 3608, the same method as explained in conjunction with steps 3603 through 3605 for the front left wheel, is executed for the front right wheel. Then, in steps 3609 through 3611, the method is executed for the rear left wheel. Finally, in steps 3612 through 3614, the method is executed for the rear right wheel. In step 3615 the sequence of this program flow is terminated.

At this point, it should be pointed out that the sequence of processing operations given above for the individual wheels may be modified.

Figure 14:
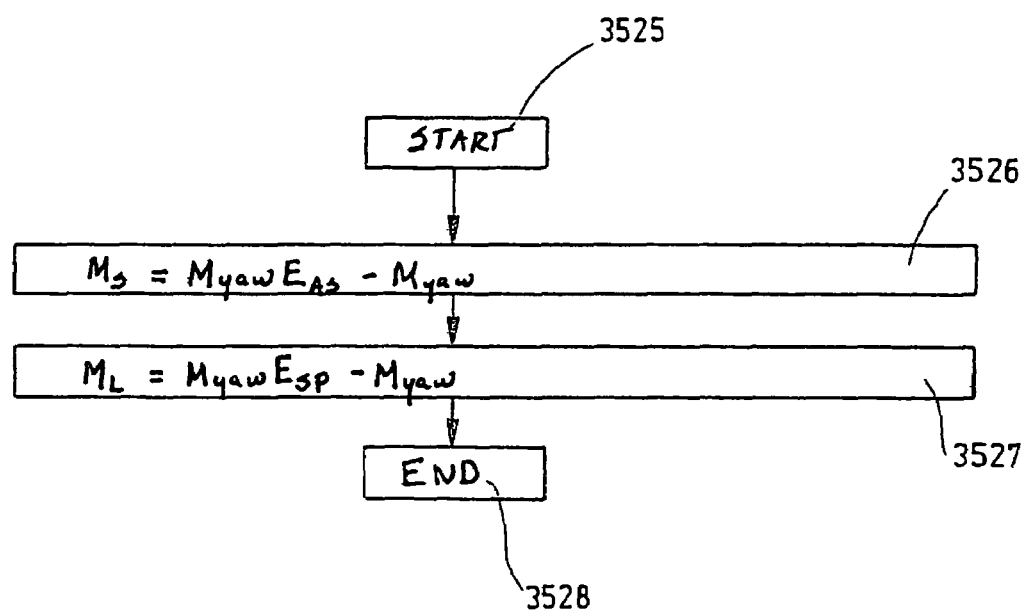
FIG. 14 shows a flow chart for elucidating the formation of intervention moments in ESP and EAS for an intervention evaluation.

FIG. 14 shows a flow chart for explaining the formation of intervention moments in ESP and EAS for an intervention evaluation. The change in moments due to the ESP and EAS interventions are considered stabilizing moments changing the longitudinal and transverse forces, respectively. At this point, other systems having the same effect but different interfaces may also be introduced. Since the formation of such an interface may be highly significant from the point of view of system engineering, this step is explicitly executed as such.

To form the intervention moment in the direction of the normal force, the computation steps explained in connection with FIG. 14 and discussed in connection with FIGS. 10 through 13 may be used as examples of the procedure for conclusively evaluating the effect of the interventions in the normal force distribution regarding the overall vehicle stability compared to systems which influence longitudinal and transverse forces. A signal $M_N$ which describes the change in the yaw moment about the vehicle's vertical axis acting on the vehicle's center of gravity is expected as an interface signal, by analogy with $M_S$ for the lateral force intervention and $M_L$ for longitudinal force intervention.

The meaning of the method steps provided in FIG. 14 is explained first.

3525: Start

3526: $M_S=M_{yaw}E_{AS}-M_{yaw}$ . . . yaw moment from EAS intervention minus working point 3527: $M_L=M_{yaw}E_{SP}-M_{yaw}$ . . . yaw moment from [EAS [sic; ESP]] ESP intervention minus working point 3528: End After the start of the routine in step 3525, in step 3526 the interface signal for the lateral force intervention is computed as the yaw moment from the EAS intervention minus the working point regarding the lateral force. In a comparable manner, in step 3527, the interface signal for the longitudinal force intervention is computed by subtraction. In step 3528, this subprogram is terminated.

Figure 15A:
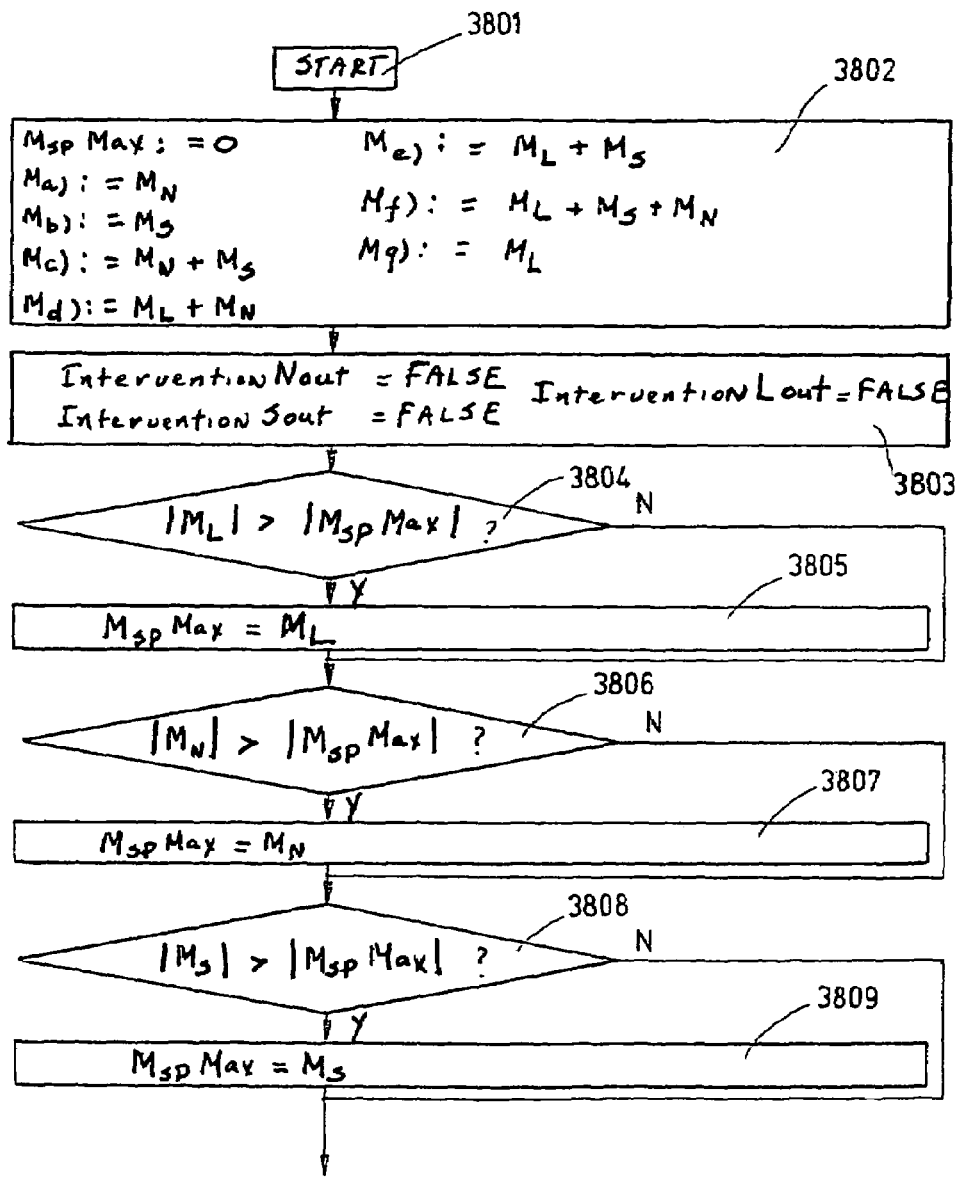
FIG. 15 shows a flow chart for elucidating the prioritization, evaluation, and selection of stabilizing interventions.
Figure 15B:
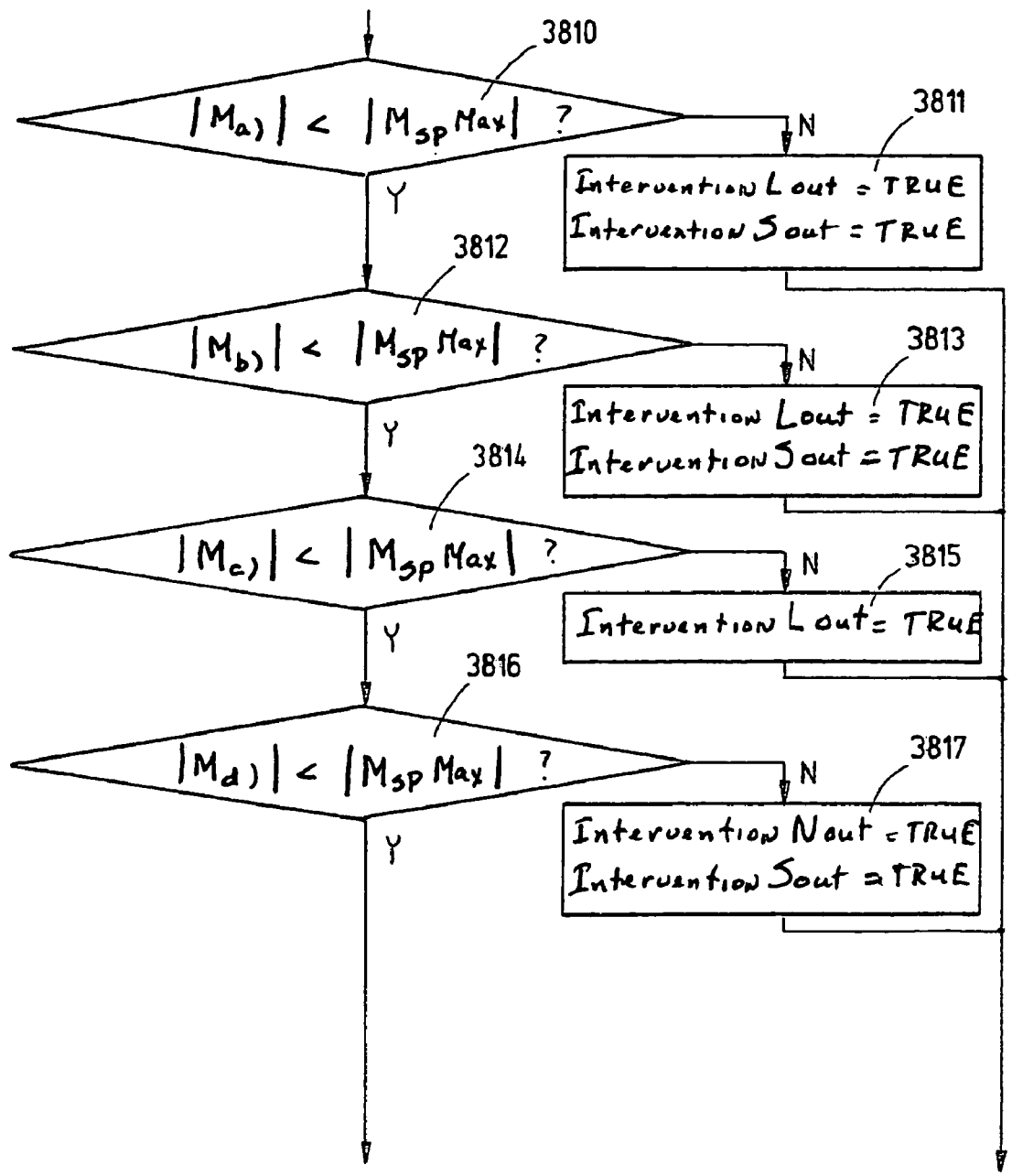
Figure 15C:
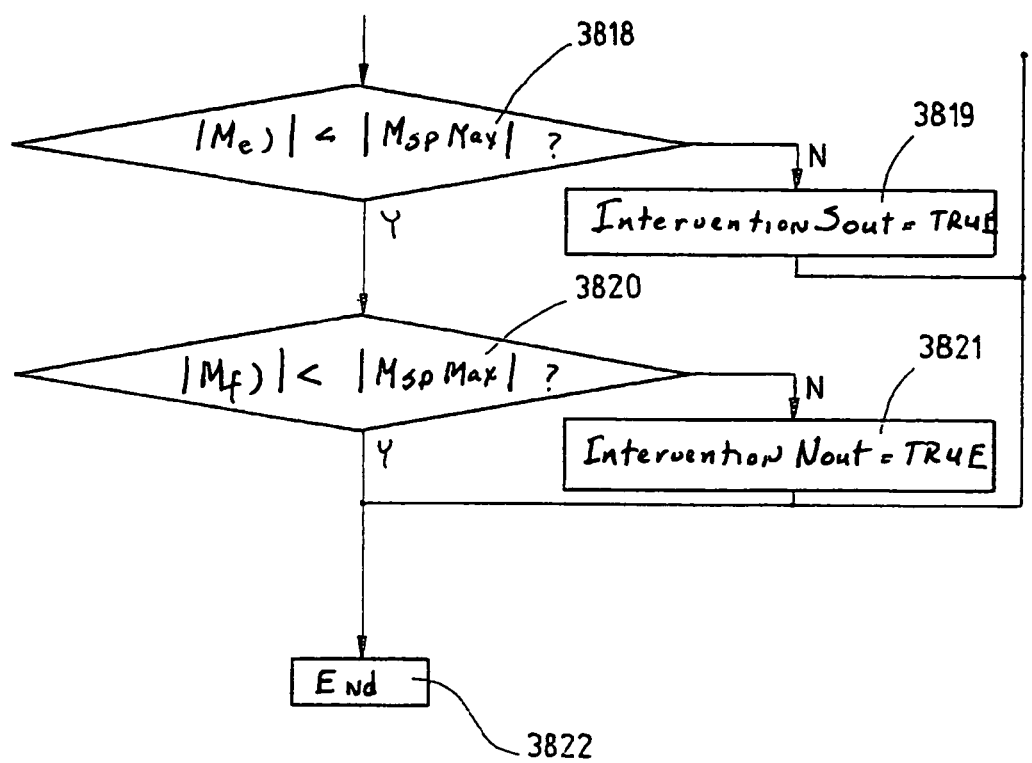

FIG. 15 shows a flow chart explaining the prioritization, evaluation, and selection of stabilizing interventions. Initially the selection of the maximum moment $M_{SP}Max$ is explained. The possible interventions in the moment acting on the vehicle's center of gravity—normal force intervention, lateral force intervention, and longitudinal force intervention—are checked as follows:

a) moment due to normal force distribution b) moment due to lateral force intervention c) a)+b)

d) g)+a)

e) g)+b)

f) a)+b)+g)

g) moment due to longitudinal force intervention

The number of options is $2^{n-1}$, where n=3=number of intervention options. These options are played out in the sequence mentioned on the basis of a comparison of absolute values and compared with the required moment acting on the vehicle's center of gravity $M_{SP}Max$ previously determined on the basis of a comparison of absolute values. If $M_{SP}Max$ is achieved, the first intervention in this sequence is selected and allowed. The prioritization of interventions is thus predefined in the sequence of the above listing.

The vehicle is successfully stabilized in each case, if stabilization is requested and is possible, using these simple queries. It is possible, for example, that ESP cannot be activated, for example, due to a fault in an ABS valve; however, a required stabilizing moment (setpoint slip) is output by ESP. Its effect is then implemented, for example, by EAR by a normal force intervention and by EAS by a lateral force intervention.

It is also possible, for example, that the moment request by ESP is greater than that by EAR and EAS. Then the first one is selected as $M_{SP}Max$, but it is not put through, since the summation of moments due to normal and lateral force variation is sufficient to represent this moment.

It is also possible that a sum intervention is weaker and therefore possibly more comfortable than an individual intervention, for example, by bringing the tire forces into the downward sloping ranges of the characteristic curves. Therefore, to check combined interventions, longitudinal force intervention, known to be uncomfortable, is evaluated last by the brake system.

In this sequence of the computing steps it is assumed that the longitudinal force intervention means the least comfort and greatest loss of speed, and a chassis intervention to change the normal force distribution offers the greatest comfort. It is also assumed that an intervention into the steering system for building up lateral forces represents little loss of comfort for the driver.

The query for absolute values is performed at this point in order to compare interventions regardless or their plus or minus signs. The query is sufficient to permit the correct intervention. However, the prerequisite is that the interventions by the subsystems pursue the same objective; otherwise the overall effect is perceptibly non-homogeneous. For example, it is conceivable that at a certain instance a subsystem reduces the float angle of the vehicle to improve vehicle stability, for example, on the basis of float angle estimation algorithms. Another subsystem, however, performs yaw rate control against understeering tendencies almost at the same time. This might result in a combination of interventions which makes the influence on the vehicle rapidly and perceptibly go from plus to minus or vice-versa. In developing such composite systems, special attention must be paid to the fact that such interventions are perceptible and/or disturbing.

As an alternative to this algorithm, it would be conceivable to weight the effects of all interventions and, after examining all interventions, select the one that implements the required $M_{SP}Max$, but keeps the smallest possible distance to it. This would make a predefinition of priorities as done here dispensable. Instead, a priority would be computed in each cycle. However, this advantage is offset by higher computing costs.

Before explaining in detail the method illustrated in FIG. 15, the meaning of the method steps shown in FIG. 15 is explained.

FIG. 15a:

3801: Start

3802: $M_{SP}Max: =0$ . . . default value for required stabilizing moment $M_a$): $=M_N$ . . . moment from normal force intervention has $1^{st}$ priority for stabilization $M_b$): $=M_S$ . . . moment from lateral force intervention has $2^{nd}$ priority for stabilization $M_c$): $=M_N+M_S$ . . . moment from normal plus lateral force intervention has $3^{rd}$ priority $M_d$): $=M_L+M_N$ . . . moment from longitudinal plus normal force intervention has $4^{th}$ priority $M_e$): $=M_L+M_S$ . . . moment from longitudinal plus lateral force intervention has $5^{th}$ priority $M_f$): $=M_L+M_S+M_N$ . . . moment from longitudinal+lateral+normal force intervention has $6^{th}$ priority $M_g$):$=M_L$ . . . moment from longitudinal force intervention has $7^{th}$ priority for stabilization

3803: InterventionNout=FALSE . . . intervention on normal force may take place InterventionSout=FALSE . . . intervention on lateral force may take place InterventionLout=FALSE . . . intervention on longitudinal force may take place

3804: $|M_L|>|M_{SP}Max|$ . . . stabilizing moment from longitudinal force intervention greater than required stabilizing moment

3805: $M_{SP}Max=M_L$ . . . moment from longitudinal force intervention required stabilizing moment

3806: $|M_N|>|M_{SP}Max|$ . . . stabilizing moment from normal force intervention greater than required stabilizing moment

3807: $M_{SP}Max=M_N$ moment from normal force intervention equal to required stabilizing moment

3808: $|M_S|>|M_{SP}Max|$ . . . stabilizing moment from lateral force intervention greater than required stabilizing moment

3809: $M_{SP}Max=M_S$ . . . moment from lateral force intervention equal to required stabilizing moment FIG. 15b:

3810: $|M_S|<|M_{SP}Max|$ . . . absolute value of stabilizing moment from a) less than that of required stabilizing moment 3811: InterventionLout=TRUE . . . longitudinal force intervention off
InterventionSout=TRUE . . . lateral force intervention off
3812: $|M_{b)}|<|M_{SP}Max|$ . . . absolute value of stabilizing moment from b) less than that of required stabilizing moment
3813: InterventionLout=TRUE . . . longitudinal force intervention off
InterventionNout=TRUE . . . normal force intervention off
3814: $|M_{c)}|<|M_{SP}Max|$ . . . absolute value of stabilizing moment from c) less than that of required stabilizing moment
3815: InterventionLout=TRUE . . . longitudinal force intervention off
3816: $|M_{d)}|<|M_{SP}Max|$ . . . absolute value of stabilizing moment from d) less than that of required stabilizing moment
3817: InterventionNout=TRUE . . . normal force intervention off
InterventionSout=TRUE . . . lateral force intervention off
FIG. 15c:
3818: $|M_{e)}|<|M_{SP}Max|$ . . . absolute value of stabilizing moment from e) less than that of required stabilizing moment
3819: InterventionSout=TRUE . . . lateral force intervention off
3820: $|M_{f)}|<|M_{SP}Max|$ . . . absolute value of stabilizing moment from f) less than that of required stabilizing moment
3821: InterventionNout=TRUE . . . normal force intervention off
3822: End The program flow starts in step 3801. Subsequently, in step 3802, moments are computed for further processing as a function of the priorities of the interventions. In step 3803, the output values which determine whether interventions may take place are established. Initially it is established that normal force intervention, lateral force intervention, and longitudinal force intervention may take place.

In step 3804 it is determined whether the stabilizing moment from the longitudinal force intervention is greater than the required stabilizing moment. If this is the case, the moment from the longitudinal force intervention is stored in step 3805 as the required stabilizing moment. Then, the procedure continues with step 3806. If the query in step 3804 is answered with NO, the procedure still continues with step 3806.

In step 3806 it is determined whether the stabilizing moment from the normal force intervention is greater than a required stabilizing moment. If this is the case, the moment from the normal force intervention is stored in step 3807 as the required stabilizing moment. Then, the procedure continues with step 3808. If the query in step 3806 is answered with NO, the procedure still continues with step 3808.

In step 3808 it is checked whether the stabilizing moment from the lateral force intervention is greater than the required stabilizing moment. If this is the case, the moment from the lateral force intervention is stored as the required stabilizing moment. Then, the procedure continues with step 3810. If the query in step 3808 is answered with NO, the procedure still continues with step 3810.

In step 3810 it is checked whether the absolute value of stabilizing moment $M_{a)}$ is less than that of the required stabilizing moment. If this is the case, both a longitudinal force intervention and a lateral force intervention are turned off in step 3811.

If the query in step 3810 is answered with YES, it is determined in step 3812 whether the absolute value of stabilizing moment $M_{b)}$ is less than that of a required stabilizing moment. If this is not the case, a longitudinal force intervention and a normal force intervention are turned off.

If the query in step 3812 is answered with YES, it is determined in step 3814 whether the absolute value of stabilizing moment $M_{c)}$ is less than that of the required stabilizing moment. If this is not the case, the longitudinal force intervention is turned off.

If the query in step 3814 is answered with YES, it is checked in subsequent step 3816 whether the absolute value of stabilizing moment $M_{d)}$ is less than that of the required stabilizing moment. If this is not the case, normal force intervention and lateral force intervention are turned off.

If, however, the query in step 3816 is answered with YES, it is determined in step 3818 whether the absolute value of stabilizing moment $M_{e)}$ is less than that of a required stabilizing moment. If this is not the case, the lateral force intervention is turned off.

If, however, the query in step 3818 is answered with YES, it is determined in step 3820 whether the absolute value of stabilizing moment $M_{f)}$ is less than that of the required stabilizing moment. If this is not the case, the normal force intervention is turned off.

If the query of step 3820 is answered with YES, the procedure is terminated in step 3822. The procedure is also terminated after the particular intervention variables have been turned off in steps 3811, 3813, 3815, 3817, 3819, and 3821.

The preceding description of the exemplary embodiments according to the present invention is only used for illustrative purposes and not to limit the present invention. Various changes and modifications are possible within the framework of the present invention.

What is claimed is:

1. A system for monitoring handling of a vehicle, comprising:
   a plurality of individual systems for influencing the handling of the vehicle; and
   a management device configured to manage an influence on the handling by the individual systems;
   wherein the individual systems include at least two of an Electronic Stabilizing Program (ESP), front axle steering with superimposed stabilizing intervention (EAS), and chassis control with superimposed stabilizing intervention (EAR) and Active Body Control (ABC).

2. The system as recited in claim 1, wherein the management device is implemented in a control unit which communicates with control units of the individual systems via an interface.

3. The system as recited in claim 1, wherein the management device is implemented in a separate control unit.

4. The system as recited in claim 1, wherein the management device is implemented in at least one control unit of the individual systems.

5. The system as recited in claim 1, wherein the management device is configured to receive setpoint values determined by the individual systems and actual values as input, the management device is configured to determine potential effects of the individual systems from the input values and the management device is configured to output values which influence effects of the individual systems.

6. The system as recited in claim 1, wherein the management device is configured to suppress interventions by individual systems.

7. A method for monitoring the handling of a vehicle, the handling of the vehicle being influenced by a plurality of individual systems, comprising:

provides a management device; and managing the influence on the handling by the individual systems using the management device;

wherein the individual systems include at least two of an Electronic Stabilizing Program (ESP), front axle steering with superimposed stabilizing intervention (EAS), and chassis control with superimposed stabilizing intervention (EAR) and Active Body Control (ABC).

8. The method as recited in claim 7, further comprising:

communicating by the management device with control units of the individual systems via an interface, the management device being implement in a control unit.

9. The method as recited in claim 7, wherein the providing step includes providing the management device as a separate control unit.

10. The method as recited in claim 7, wherein the providing step includes providing the management device in at least one control unit of the individual systems.

11. The method as recited in claim 7, further comprising:

inputting setpoint values determined by the individual systems and actual values, into the management device;

determining potential effects of the individual systems from the input values; and outputting, by the management device, values which influence effects of individual systems.

12. The method as recited in claim 7, further comprising:

suppressing, by the management device, interventions by individual systems.

* * * * *